(12) United States Patent
Hinckley

(10) Patent No.: US 9,229,539 B2
(45) Date of Patent: Jan. 5, 2016

(54) INFORMATION TRIAGE USING SCREEN-CONTACTING GESTURES

(75) Inventor: Ken Hinckley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 437 days.

(21) Appl. No.: 13/490,456

(22) Filed: Jun. 7, 2012

(65) Prior Publication Data

US 2013/0328786 A1    Dec. 12, 2013

(51) Int. Cl.
    G06F 3/041      (2006.01)
    G06F 3/033      (2013.01)
    G06F 3/0488     (2013.01)

(52) U.S. Cl.
    CPC ............. *G06F 3/033* (2013.01); *G06F 3/041* (2013.01); *G06F 3/04883* (2013.01); *G06F 3/04886* (2013.01); *G06F 2203/04808* (2013.01)

(58) Field of Classification Search
    None
    See application file for complete search history.

(56) References Cited

U.S. PATENT DOCUMENTS

| | | | |
|---|---|---|---|
| 6,525,749 B1* | 2/2003 | Moran et al. | 715/863 |
| 7,694,240 B2 | 4/2010 | Kariathungal et al. | |
| 7,761,814 B2 | 7/2010 | Rimas-Ribikauskas et al. | |
| 8,539,375 B1* | 9/2013 | Thorsander et al. | 715/821 |
| 2002/0097229 A1 | 7/2002 | Rose et al. | |
| 2002/0149630 A1 | 10/2002 | Kitainik et al. | |
| 2006/0085767 A1 | 4/2006 | Hinckley et al. | |
| 2006/0267967 A1 | 11/2006 | Hinckley et al. | |
| 2008/0046425 A1* | 2/2008 | Perski | 707/6 |
| 2008/0168403 A1* | 7/2008 | Westerman et al. | 715/863 |
| 2010/0011310 A1* | 1/2010 | Rainisto | 715/769 |
| 2010/0283748 A1* | 11/2010 | Hsieh et al. | 345/173 |
| 2011/0191704 A1 | 8/2011 | Hinckley et al. | |

OTHER PUBLICATIONS

Appert, et al., "Using Strokes as Command Shortcuts: Cognitive Benefits and Toolkit Support", Proceedings of the 27th International Conference on Human Factors in Computing Systems (Special Interest Group on Computer-Human Interaction (SIGCHI) '09), Apr. 4-9, 2009, pp. 2289-2298, Association for Computing Machinery (ACM), Boston, Massachusetts.

(Continued)

*Primary Examiner* — Nicholas Lee
(74) *Attorney, Agent, or Firm* — Steve Wight; Sandy Swain; Micky Minhas

(57) ABSTRACT

A user is able to triage information on a touch-enabled computing device. Information objects are displayed on a touch-sensitive screen of the device. Whenever the user makes a first gesture on the screen using a first user input modality, the first gesture and that it was made using this first modality are identified, a first information management operation specifically associated with the first gesture being made with this first modality is also identified, and this first operation is implemented on the objects. Whenever the user subsequently makes a second gesture on the screen using a second user input modality which is different than the first modality, the second gesture and that it was made using this second modality are identified, a second information management operation specifically associated with the second gesture being made with this second modality is also identified, and this second operation is implemented on the objects.

20 Claims, 11 Drawing Sheets

(56) References Cited

OTHER PUBLICATIONS

Li, "Gesture Search: A Tool for Fast Mobile Data Access", Proceedings of the 23nd Annual ACM Symposium on User Interface Software and Technology (UIST '10), Oct. 3-6, 2010, pp. 87-96, Association for Computing Machinery (ACM), New York, New York.

Roudaut, et al., "Leaf Menus: Linear Menus with Stroke Shortcuts for Small Handheld Devices", Proceedings of the 12th IFIP TC 13 International Conference on Human-Computer Interaction (INTERACT '09): Part I, Lecture Notes in Computer Science (LNCS) 5726, Aug. 2009, pp. 616-619, Springer-Verlag Berlin, Heidelberg, Germany.

* cited by examiner

INFORMATION TRIAGE USING SCREEN-CONTACTING GESTURES

BACKGROUND

Due to factors such as economic globalization and ongoing advances in computing, data communication, and computer networking technologies, people across the globe are becoming increasingly mobile. Examples of such technology advances include the Internet, the World Wide Web, cellular wireless networks, wireless local area networks, and mobile computing devices and applications. Various types of mobile computing devices are now commercially available which allow users to affordably perform full-fledged computing and data communication activities while they are on the move. Almost all of these devices have a touch-sensitive display screen and users operate them by making various gestures on the display screen. Smartphones and tablet computers are two examples of such devices, and their popularity is increasing rapidly. The number and types of mobile computing applications that are available to users are also increasing rapidly, as is the usage of these applications on mobile computing devices. As a result, the amount of functionality that is available from mobile computing devices continues to increase, as does the number of people that regularly use a mobile computing device to perform their online computing and information management tasks. In fact, mobile computing devices have become a principle computing device for many people.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Information triage technique embodiments described herein are generally applicable to enabling a user to quickly triage information on a touch-enabled computing device. In one exemplary embodiment one or more information objects are displayed on a touch-sensitive display screen of the device. Whenever the user makes a first screen-contacting gesture on the screen using a first user input modality, the first screen-contacting gesture is identified, the fact that this gesture was made using the first user input modality is also identified, a first information management operation that is specifically associated with the first screen-contacting gesture being made with the first user input modality is also identified, and the first information management operation is implemented on the information objects. Whenever the user subsequently makes a second screen-contacting gesture on the screen using a second user input modality which is different than the first user input modality, the second screen-contacting gesture is identified, the fact that this gesture was made using the second user input modality is also identified, a second information management operation that is specifically associated with the second screen-contacting gesture being made with the second user input modality is also identified, and the second information management operation is implemented on the information objects.

In another exemplary embodiment a list of information objects is displayed on the touch-sensitive display screen of the touch-enabled computing device. Whenever the user makes a multi-object framing gesture on the screen using two fingers, where one of the fingers contacts the screen on top of a first information object in the list and the other of the fingers contacts the screen on top of a second information object in the list, the framing gesture is identified, the fact that this gesture was made using two fingers is also identified, and the first and second information objects and any other information objects there-between in the list are selected. Whenever, concurrent with the multi-object framing gesture being made on the screen, the user also makes an object manipulation gesture on the screen using a stylus which is held by the user, where the object manipulation gesture includes one or more strokes each of which passes over one or more of the selected information objects, the object manipulation gesture is identified, the fact that this gesture was made using the stylus is also identified, an information management operation that is specifically associated with the object manipulation gesture being made with the stylus is also identified, and the information management operation is implemented on the selected information objects.

DESCRIPTION OF THE DRAWINGS

The specific features, aspects, and advantages of the information triage technique embodiments described herein will become better understood with regard to the following description, appended claims, and accompanying drawings where:

DETAILED DESCRIPTION

Figure 1:
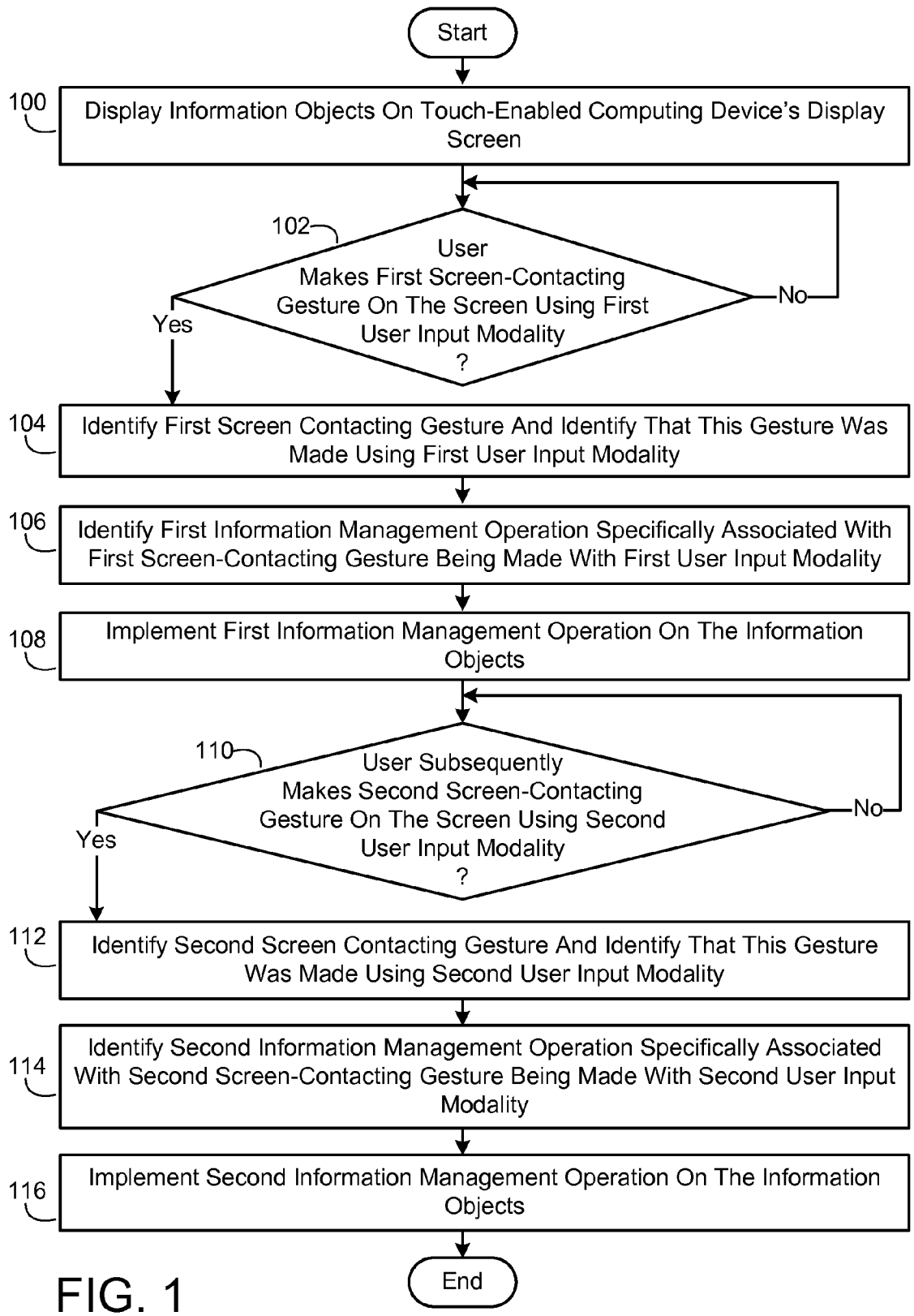
FIG. 1 is a flow diagram illustrating one embodiment, in simplified form, of a process for enabling a user to quickly triage information on a touch-enabled computing device.

In the following description of information triage technique embodiments reference is made to the accompanying drawings which form a part hereof, and in which are shown, by way of illustration, specific embodiments in which the information triage technique can be practiced. It is understood that other embodiments can be utilized and structural changes can be made without departing from the scope of the information triage technique embodiments.

The term "screen-contacting gesture" is used herein to refer to either a physical tap or stroke that is made directly on a touch-sensitive display screen of a computing device by a user via a given user input modality. The term "touch-enabled computing device" is used herein to refer to a networking-enabled client computing device that includes a touch-sensitive display screen which can detect the presence, location, and path of movement if applicable, of screen-contacting gestures that the user makes on the display screen using a given user input modality. For simplicity's sake, the touch-sensitive display screen is hereafter simply referred to as a "display screen".

As is appreciated in the art of client computing devices, many of today's touch-enabled computing devices have a display screen which is multi-touch-sensitive. In other words, the display screen can detect the presence, location, and path of movement if applicable, of a plurality of concurrent screen-contacting gestures made by the user. Many of today's touch-enabled computing devices also include a user-facing video camera. The information triage technique embodiments described herein are operational with any type of touch-enabled computing device examples of which include, but are not limited to, touch-enabled handheld computing devices (such as conventional smartphones, personal digital assistants (PDAs), and the like), conventional tablet computers (which by definition are touch-enabled), conventional touch-enabled e-book readers (also known as e-readers), conventional touch-enabled laptop computers (also known as notebook computers), and conventional touch-enabled desktop computers.

The term "sector" is used herein to refer to a segmented region of a touch-enabled computing device's display screen in which a particular type of graphical user interface (GUI) and/or information is displayed, or a particular type of function is performed. It will be appreciated that the display screen can include a plurality of sectors which may or may not overlap with one another. The term "information object" is used herein to refer to a particular item of online (e.g., digital) information content, or various types of representations thereof (such as an iconic or a web hyperlink representation, among others), which can include one or more different types of digital information such as text, images, animations, audio, video, web hyperlinks, and the like.

1.0 Information Triage Using Screen-Contacting Gestures

Generally speaking, the information triage technique embodiments described herein enable a user to quickly triage information on a touch-enabled computing device. As is appreciated in the art of client computing devices, there are substantial differences between the user interface and methods of use of a client computing device which is touch enabled and those of a client computing device which is not touch-enabled. As a result, the features, capabilities and operational workflow demanded of many applications running on a touch-enabled client computing device are different than those demanded of the same applications running on a client computing device that is not touch-enabled. Information management tasks which are regularly performed by a user have increased significance on a touch-enabled computing device. Examples of such information management tasks include, but are not limited to, email management (such as quickly triaging a large number of email messages, or replying to desired ones of these email messages, or attaching the digital equivalent of a post-it note to desired ones of these email messages to remind oneself what to do with them when time permits, among other things), and personal information management (such as capturing calendar and to-do items, or capturing notes and ideas, or managing documents, or managing audio or video content, among other things).

The information triage technique embodiments described herein are advantageous for various reasons including, but not limited to, the following. Generally speaking, the information triage technique embodiments enable the user to quickly triage their email messages and other types of information objects, where this triage includes replying to desired messages, filing the messages and other types of information objects into different folders/categories, and annotating desired information objects, among other things. Thus, the information triage technique embodiments make it easy for the user to regularly organize their messages and other types of information objects, and prioritize their various work-related and personal related tasks and responsibilities.

1.1 Distinguishing Between Different User Input Modalities

In the information triage technique embodiments described herein a user can make screen-contacting gestures on a touch-enabled computing device using various types of user input modalities including, but not limited to, one or more fingers of the user, or one or more objects which are held by the user such as a conventional stylus (also referred to as a "pen") or the like. It will be appreciated that the information triage technique embodiments are compatible with any of the various types of passive styli which are commercially available, and with any of the various types of active (e.g., electronic/digital) styli which are commercially available. Generally speaking and as will be described in more detail hereafter, the information triage technique embodiments distinguish between screen-contacting gestures that are made using different types of user input modalities by identifying the one or more types of user input modalities that make each gesture. More particularly, and by way of example but not limitation, in an exemplary embodiment of the information triage technique a distinction is made between screen-contacting gestures that are made by one or more fingers and screen-contacting gestures that are made by a stylus. The information triage technique embodiments additionally support both unimodal screen-contacting gestures (e.g., gestures that employ just a single type of user input modality) and bimodal screen-contacting gestures (e.g., gestures that combine two different types of user input modalities).

As is appreciated in the art of client computing devices, various conventional methods can be employed to identify the one or more types of user input modalities that make each screen-contacting gesture, where the specific method that is employed depends upon the particular type of display screen technology that is used in the touch-enabled computing device. By way of example but not limitation, the one or more types of user input modalities that make each screen-contacting gesture can be identified by determining the areal size of each portion of the display screen that is being physically contacted by a the gesture (e.g., the areal size of the portion of the display screen which is contacted by a finger is generally measurably larger than the areal size of the portion of the display screen which is contacted by a stylus). In the case where the computing device includes a user-facing video camera, the one or more types of user input modalities that make each screen-contacting gesture can also be identified using the video camera.

As will be appreciated from the more detailed description that follows, the just described abilities to distinguish between screen-contacting gestures that are made using different types of user input modalities, and to support both unimodal and bimodal screen-contacting gestures, are advantageous for various reasons including, but not limited to, the following. User interactions with the touch-enabled computing device that employ one type of user input modality (e.g., one or more fingers) can be treated in a manner that is different from user interactions with the computing device that employ another type of user input modality (e.g., a stylus). This allows the expressiveness of the computing device's user interface and the number of different screen-contacting gestures that are supported by the user interface to be maximized. This also allows the computing device's user interface to take optimal advantage of the natural strengths of each type of user input modality so as to maximize the intuitiveness of each screen-contacting gesture.

1.2 Triaging Information Objects Using Independent Sequence of Gestures

FIG. 1 illustrates one embodiment, in simplified form, of a process for enabling a user to quickly triage information on a touch-enabled computing device. As will be appreciated from the more detailed description that follows, an independent sequence of screen-contacting gestures is employed in this embodiment. As exemplified in FIG. 1, the process starts in block 100 with displaying one or more information objects within a first sector on the computing device's display screen. Whenever the user makes a first screen-contacting gesture on the display screen using a first user input modality (block 102, Yes), the following actions occur. The first screen-contacting gesture is identified and the fact that this gesture was made using the first user input modality is also identified (block 104). A first information management operation that is specifically associated with the first screen-contacting gesture being made with the first user input modality is then identified (block 106). The first information management operation is then implemented on the information objects (block 108). As will be appreciated from the more detailed description that follows, the first screen-contacting gesture is made within a first one or more sectors on the display screen, one of which is the first sector.

Referring again to FIG. 1, whenever the user subsequently makes a second screen-contacting gesture on the display screen using a second user input modality which is different than the first user input modality (block 110, Yes), the following actions occur. The second screen-contacting gesture is identified and the fact that this gesture was made using the second user input modality is also identified (block 112). A second information management operation that is specifically associated with the second screen-contacting gesture being made with the second user input modality is then identified (block 114). The second information management operation is then implemented on the information objects (block 116). As will be appreciated from the more detailed description that follows, the second screen-contacting gesture is made within a second one or more sectors on the display screen, one of which is the same as one of the first one or more sectors on the display screen within which the first screen-contacting gesture is made.

It will be appreciated that various types of user input modalities can be employed for the first and second user input modalities. By way of example but not limitation, in one implementation of the information triage technique embodiment illustrated in FIG. 1 the first user input modality is a stylus which is held by the user, and the second user input modality is one or more fingers of the user. In another implementation of the information triage technique embodiment exemplified in FIG. 1 the first user input modality is one or more fingers of the user and the second user input modality is the stylus.

Figure 2A:
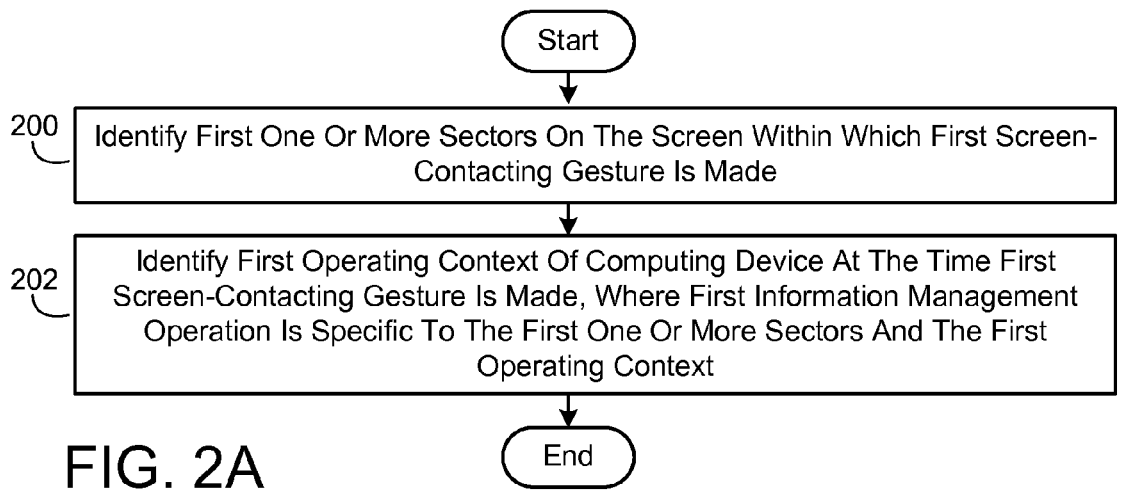
FIG. 2A is a flow diagram illustrating an exemplary embodiment, in simplified form, of a process for identifying a first information management operation that is specifically associated with a first screen-contacting gesture being made with a first user input modality.

FIG. 2A illustrates an exemplary embodiment, in simplified form, of a process for identifying the first information management operation that is specifically associated with the first screen-contacting gesture being made with the first user input modality. As exemplified in FIG. 2A, the process starts in block 200 with identifying the first one or more sectors on the display screen within which the first screen-contacting gesture is made. A first operating context of the computing device at the time the first screen-contacting gesture is made is then identified, where the first information management operation is specific to this first one or more sectors and this first operating context (block 202).

Figure 2B:
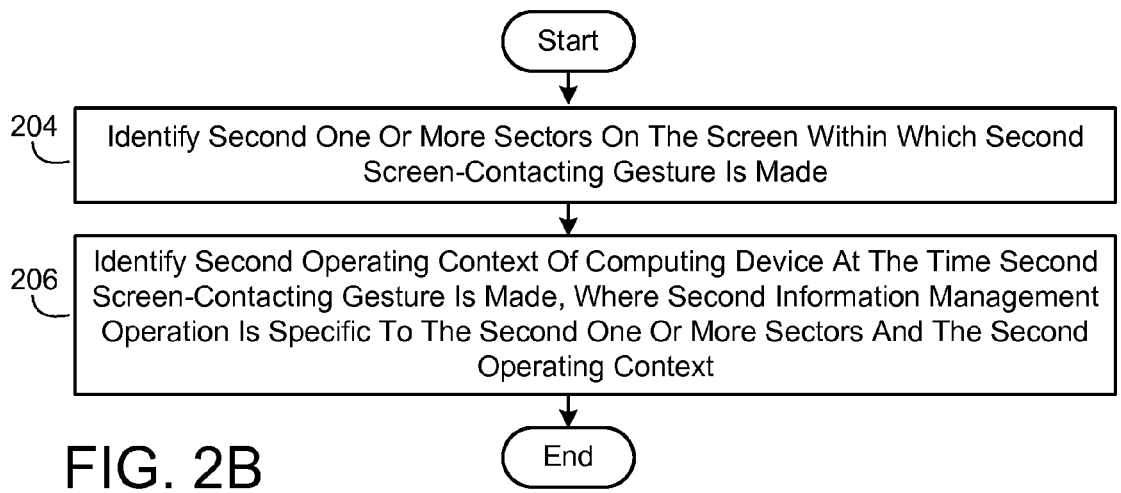
FIG. 2B is a flow diagram illustrating an exemplary embodiment, in simplified form, of a process for identifying a second information management operation that is specifically associated with a second screen-contacting gesture subsequently being made with a second user input modality.

FIG. 2B illustrates an exemplary embodiment, in simplified form, of a process for identifying the second information management operation that is specifically associated with the second screen-contacting gesture subsequently being made with the second user input modality. As exemplified in FIG. 2B, the process starts in block 204 with identifying the second one or more sectors on the display screen within which the second screen-contacting gesture is made. A second operating context of the computing device at the time the second screen-contacting gesture is made is then identified, where the second information management operation is specific to this second one or more sectors and this second operating context (block 206).

Exemplary implementations of the information triage technique embodiment exemplified in FIG. 1 will now be described. In these exemplary implementations the information objects which are displayed on the display screen of the touch-enabled computing device are a list of email messages which have been sent to the user. It will be appreciated that in addition to email messages, the information triage technique embodiments exemplified in FIG. 1 are also operational with a wide variety of other types of information objects which are involved in the broader workflow of personal information management. Examples of such other types of information objects include, but are not limited to, attachments to the email messages, a calendar, a to-do list, various types of document files, audio files, video files, and search results. It will further be appreciated that in addition to the information objects being displayed in the form of a list, the information objects can also be displayed in various other forms. By way of example but not limitation, in an alternate embodiment of the information triage technique described herein the information objects can be displayed as an array of graphical elements (such as icons or the like) each of which corresponds to a different information object.

Figure 3A:
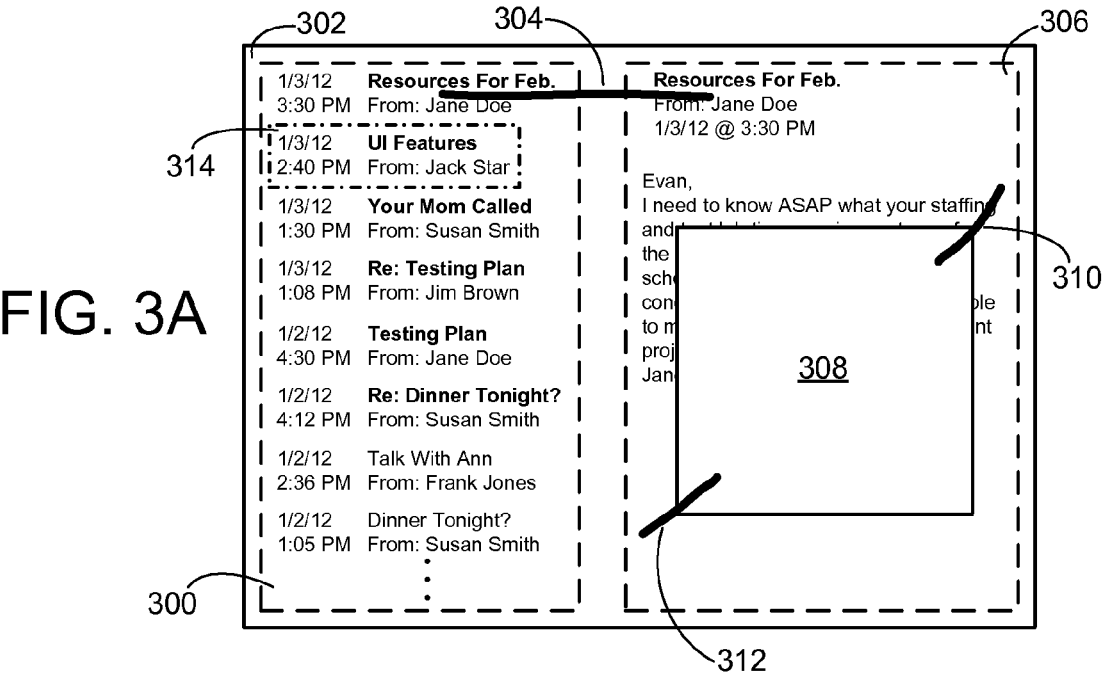
FIGS. 3A and 3B are diagrams illustrating an exemplary implementation, in simplified form, of the information triage technique embodiment exemplified in FIG. 1.
Figure 3B:
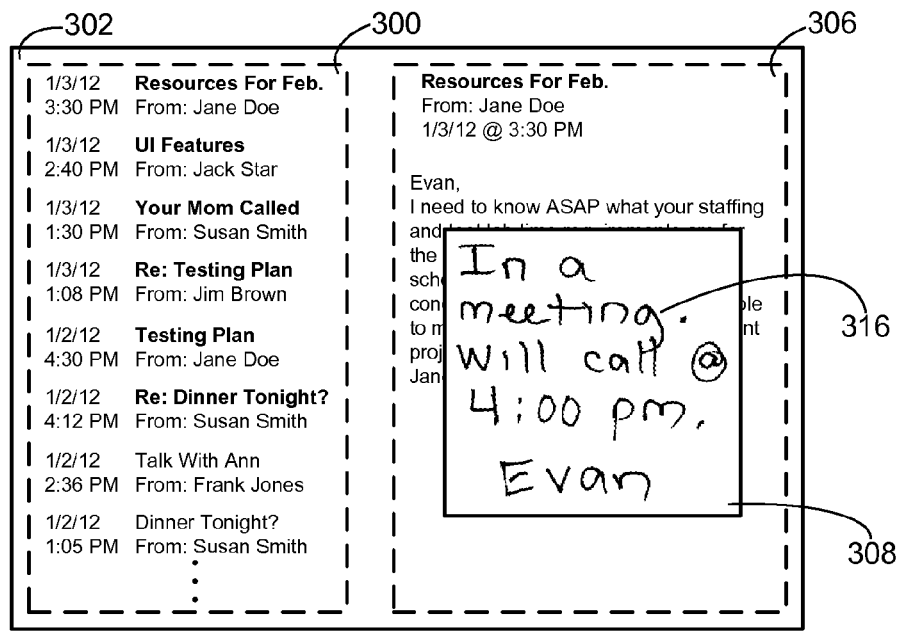

FIGS. 3A and 3B illustrate an exemplary implementation, in simplified form, of the information triage technique embodiment exemplified in FIG. 1. As exemplified in FIG. 3A, a list of email messages (e.g., message 314) is displayed within the first sector 300 on the display screen 302 of the touch-enabled computing device. The first screen-contacting gesture that the user makes on the display screen 302 using the first user input modality (not shown) is a reply gesture 304. The reply gesture exemplified in FIG. 3A is a stroke 304 which starts on top of a desired one of the email messages in the list (in the illustrated case, a message from Jane Doe entitled "Resources For Feb." which was sent Jan. 3, 2012 at 3:30 PM) and ends within a second sector 306 on the display screen 302. Upon the identification of the reply gesture 304 and the identification of the fact that this gesture was made using the first user input modality, the contents of the desired one of the email messages are displayed within the second sector 306, and then a digital inking sector 308 is displayed on top of a portion of these contents. The operation of the digital inking sector 308 will be described in more detail hereafter.

Referring again to FIG. 3A, it will be appreciated that the particular implementation of the reply gesture 304 that is illustrated is advantageous in that it is intuitive (e.g., this gesture naturally leads the first user input modality, and hence the focus of the user's interaction with the display screen 302, from the list of email messages in the first sector 300 to the second sector 306 which serves as a message reply area). It will also be appreciated that various other implementations (not shown) of the reply gesture are possible. By way of example but not limitation, the reply gesture can include a double tap which the user makes on top of the desired one of the email messages in the list using the first user input modality.

Referring again to FIG. 3A, the second screen-contacting gesture that the user makes on the display screen 302 using the second user input modality (not shown) is a sector resizing gesture 310 and 312 which specifies how to modify the size of the digital inking sector 308. The sector resizing gesture exemplified in FIG. 3A is a conventional pinch-to-zoom gesture in which a pair of strokes 310 and 312 either move substantially toward each other or away from each other. In an exemplary embodiment of the implementation illustrated in FIG. 3A, if the pair of strokes 310 and 312 moves substantially toward each other this specifies that the size of the digital inking sector 308 is to be decreased. Correspondingly, if the pair of strokes 310 and 312 moves substantially away from each other, this specifies that the size of the digital inking sector 308 is to be increased. Upon the identification of the sector resizing gesture 310 and 312 and the identification of the fact that this gesture was made using the second user input modality, the size of the digital inking sector 308 is modified according to the sector resizing gesture. More particularly, whenever the sector resizing gesture 310 and 312 specifies that the size of the digital inking sector 308 is to be decreased, the size of this sector is decreased accordingly on the display screen 302. Similarly, whenever the sector resizing gesture 310 and 312 specifies that the size of the digital inking sector 308 is to be increased, the size of this sector is increased accordingly on the display screen 302.

It will be appreciated that various other implementations of the sector resizing gesture are also possible. By way of example but not limitation, the user can use the second user input modality to make a single stroke which starts approximately on top of a desired corner of the digital inking sector and moves substantially toward the center of this sector, in which case the desired corner can be moved toward the center of this sector accordingly on the display screen (thus reducing the size of this sector). The user can also use the second user input modality to make a single stroke which starts on top of a desired edge of the digital inking sector and moves substantially away from the center of this sector, in which case the desired edge can be moved away from the center of this sector accordingly on the display screen (thus increasing the size of this sector).

As exemplified in FIG. 3B, whenever the user makes one or more strokes 316 on the display screen 302 within the digital inking sector 308 using the first user input modality (not shown), this condition is identified, each of these strokes 316 is digitized thus creating an electronic ink representation thereof (i.e., a digital representation which mimics the strokes 316), and this digitization is displayed within the digital inking sector. It will be appreciated that the information triage technique embodiment implementation exemplified in FIG. 3B is advantageous in that it gives the user a way to quickly and conveniently reply to a desired email message, or attach an annotation to any other type of information object, where the reply/annotation can include either a brief worded response, or one or more small diagrams/sketches, or a combination thereof. When the email message reply is subsequently opened by its recipients, or the annotated information object is subsequently opened by anyone, the electronic ink that the user created will appear as the electronic equivalent of a "post-it note" which is attached to the reply/object. In another embodiment of the information triage technique described herein the user can separately create one or more of these electronic post-it notes and attach them as meta-information to a desired email message (or any other type of information object), thus allowing the semantics of the post-it notes to be determined by the type of information object they are attached to.

Referring again to FIG. 3B, the size of the digital inking sector 308 can be automatically increased or decreased as necessary in order to accommodate the strokes 316 being made by the user. By way of example but not limitation, in the case where the strokes 316 start to fill up the digital inking sector 308, the size of the sector can be automatically increased in order to provide the user with more space for their reply/annotation.

Referring again to FIG. 3A, in yet another embodiment of the information triage technique described herein after the contents of the desired one of the email messages are displayed within the second sector 306, rather than the digital inking sector 308 being displayed, the user can mark-up the message contents by using the first user input modality to make one or more strokes (not shown) on the display screen 302 directly on top of these contents. By way of example but not limitation, the user can either strike out a portion of the message contents, or circle a portion of the message contents, or underline a portion of the message contents, or write comments in the margin of the message contents, or the like, or any combination thereof. In yet another embodiment of the information triage technique the user can use the first user input modality to make a prescribed gesture on top of the message contents which operates to create more space therewithin (similar to what happens when a plurality of carriage returns are entered) in which the user can then write comments.

Figure 4A:
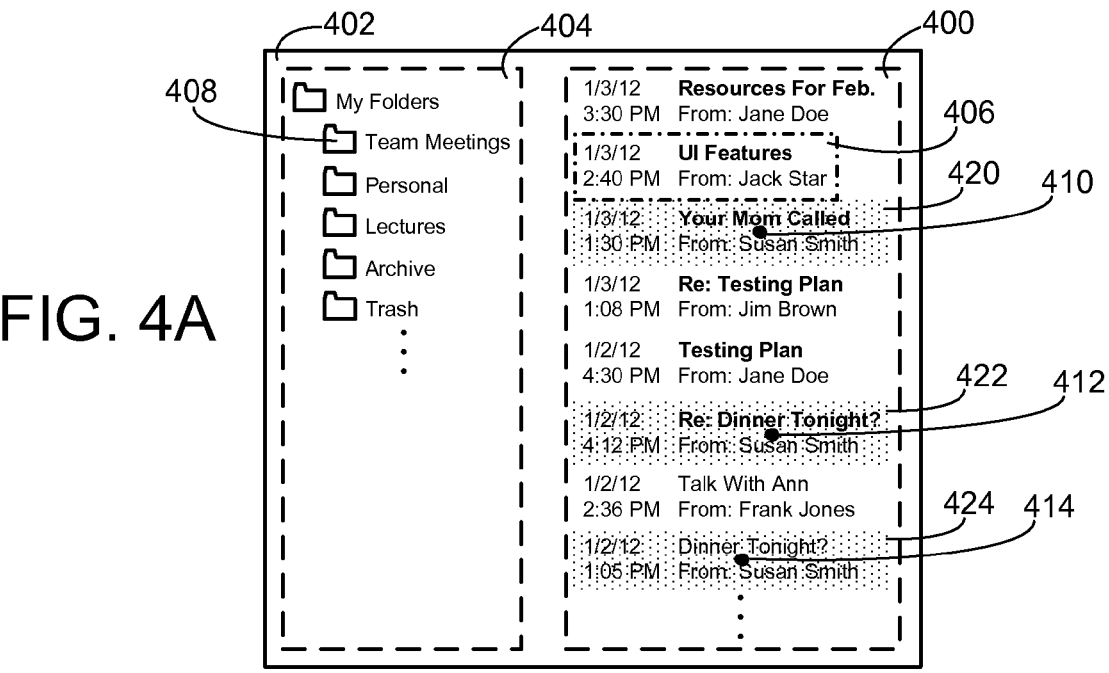
FIGS. 4A and 4B are diagrams illustrating another exemplary implementation, in simplified form, of the information triage technique embodiment exemplified in FIG. 1.
Figure 4B:
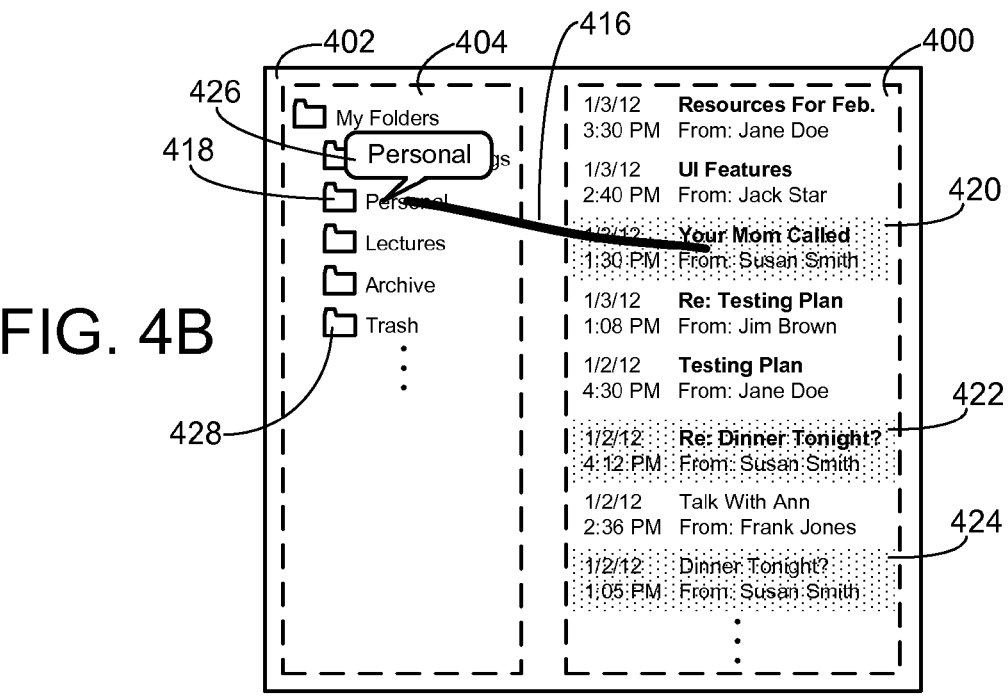

FIGS. 4A and 4B illustrate another exemplary implementation, in simplified form, of the information triage technique embodiment exemplified in FIG. 1. As exemplified in FIG. 4A, a plurality of information objects, which includes a list of email messages (e.g., message 406) in the illustrated case, is displayed within the first sector 400 on the display screen 402 of the touch-enabled computing device. One or more graphical elements (e.g., element 408), each of which corresponds to a different folder that represents a different category, are displayed within a second sector 404 on the display screen 402. The first screen-contacting gesture that the user makes on the display screen 402 using the first user input modality (not shown) includes a plurality of single-object selection gestures (three in the illustrated case) 410/412/414 each of which taps on a different one of the information objects. More particularly, in the illustrated case the first single-object selection gesture 410 taps on a message from Susan Smith entitled "Your Mom Called" which was sent Jan. 3, 2012 at 1:30 PM, the second single-object selection gesture 412 taps on another message from Susan Smith entitled "Re: Dinner Tonight?" which was sent Jan. 2, 2012 at 4:12 PM, and the third single-object selection gesture 414 taps on yet another message from Susan Smith entitled "Dinner Tonight?" which was sent Jan. 2, 2012 at 1:05 PM. Upon the identification of the plurality of single-object selection gestures 410/412/414 and the identification of the fact that these gestures were made with the first user input modality, each of the different information objects that was tapped on is selected, but is not opened.

Referring again to FIG. 4A, various types of feedback can optionally be provided to the user in order to communicate that each different information object that is tapped on 410/412/414 has been selected. By way of example but not limitation, upon the identification of each single-object selection gesture 410/412/414 and the identification of the fact that the gesture was made using the first user input modality, the information object that is tapped on by this gesture can be visually highlighted. It will be appreciated that the visual highlighting can be implemented in various ways. One such way is exemplified in FIG. 4A where the visual highlighting is implemented as either a colored or shaded transparent overlay 420/422/424 which is displayed over the information objects that are tapped on by the single-object selection gestures 410/412/414. Other types of visual feedback can also be provided to the user. Various types of haptic feedback can also be provided to the user, either in place of or in addition to the visual feedback. Examples of such haptic feedback include making the touch-enabled computing device vibrate, or in the case where the user is using an active stylus, making the active stylus vibrate, among other things.

As exemplified in FIG. 4B and referring again to FIG. 4A, the second screen-contacting gesture that the user makes on the display screen 402 using the second user input modality (not shown) is an object movement gesture 416. Generally speaking, the user can employ various types of object movement gestures to quickly file the selected information objects into a desired folder, or quickly move the selected information objects into the trash. By way of example but not limitation, the object movement gesture illustrated in FIG. 4B is a stroke 416 which starts on top of any one of the selected information objects (in the illustrated case, the message from Susan Smith entitled "Your Mom Called") and ends on top of a desired one of the graphical elements 418 (in the illustrated case, the graphical element corresponding to the "Personal" folder) within the second sector 404. Upon the identification of the object movement gesture 416 and the identification of the fact that this gesture was made using the second user input modality, the selected information objects (namely each of the different information objects that was tapped on 410/412/414) are moved into the folder (in the illustrated case, the "Personal" folder) that corresponds to the desired one of the graphical elements 418. In a non-illustrated case where the object movement gesture ends on top of the graphical element 428 within the second sector 404 that corresponds to the "Trash" folder, the selected information objects 410/412/414 will be moved into the trash.

Referring again to FIG. 4B, any of the aforementioned types of feedback can optionally be provided to the user in order to communicate that the desired one of the graphical elements 418 in the second sector 404 has been selected by the object movement gesture 416. By way of example but not limitation, upon the object movement gesture 416 ending on top of the desired one of the graphical elements 418, a callout element 426 can be displayed on the display screen 402 adjacent to the desired one of the graphical elements. As exemplified in FIG. 4B, the callout element 426 can include one or more types of information about the desired one of the graphical elements 418 such as the name of the folder that corresponds thereto, thus allowing the user to read this name whenever the second user input modality is obstructing the desired one of the graphical elements. The callout element 426 is advantageous in that it serves as a magnifying glass which enhances the user's identification of the folder that corresponds to the desired one of the graphical elements 418, and thus helps the user move the selected information objects 410/412/414 into this folder. After the selected information objects 410/412/414 have been moved into the folder that corresponds to the desired one of the graphical elements 418, the callout element 426 can be removed from the display screen 402.

Figure 5A:
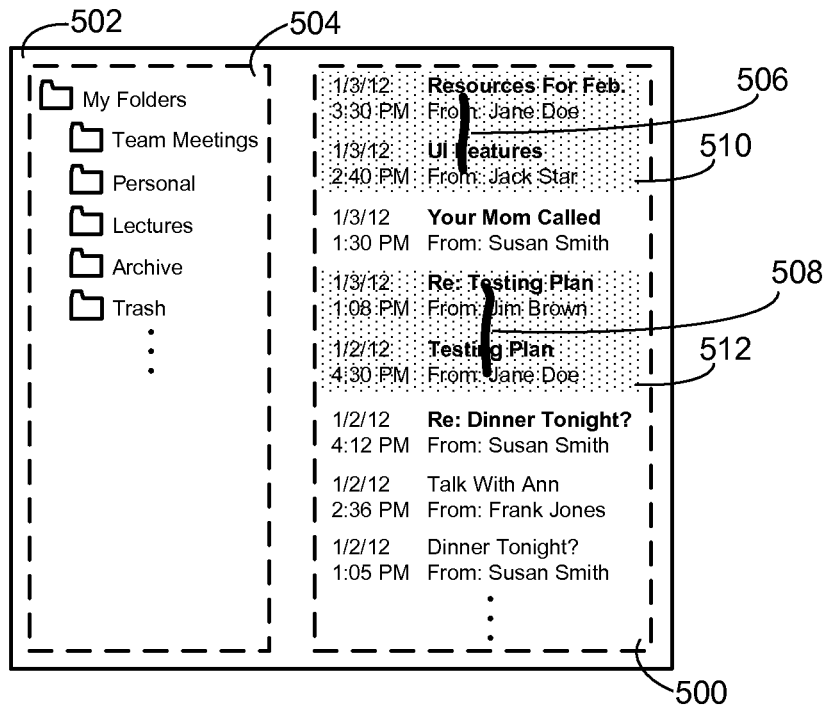
FIGS. 5A and 5B are diagrams illustrating yet another exemplary implementation, in simplified form, of the information triage technique embodiment exemplified in FIG. 1.
Figure 5B:
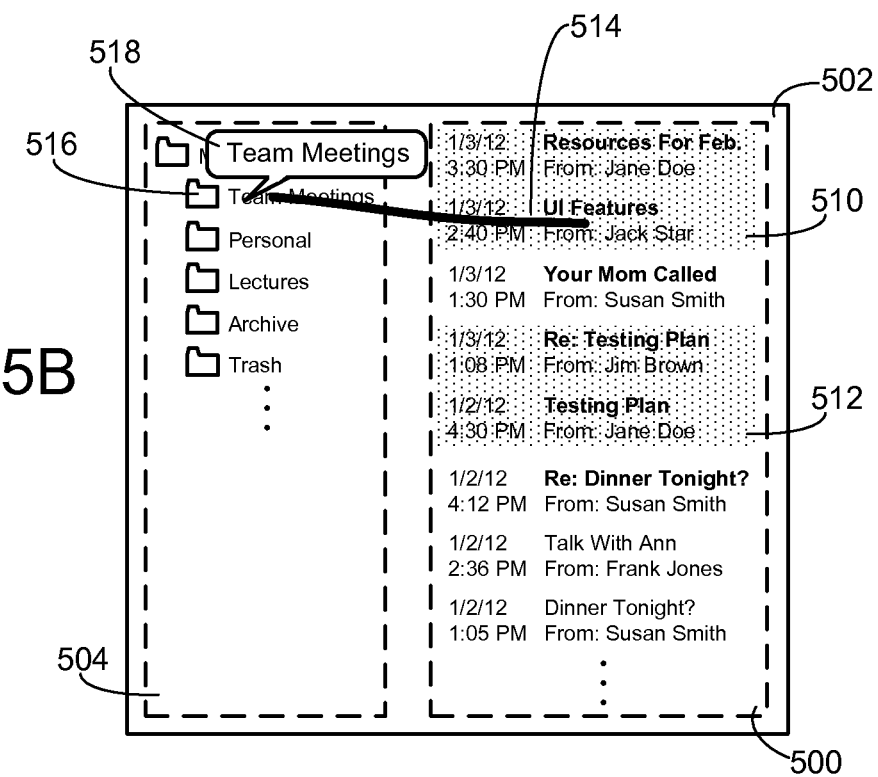

FIGS. 5A and 5B illustrate yet another exemplary implementation, in simplified form, of the information triage technique embodiment exemplified in FIG. 1. As exemplified in FIG. 5A, the same plurality of information objects as was just described in relation to FIG. 4A is displayed within the first sector 500 on the display screen 502 of the touch-enabled computing device. The same one or more graphical elements as was just described in relation to FIG. 4A are displayed within the second sector 504 on the display screen 502. The first screen-contacting gesture that the user makes on the display screen 502 using the first user input modality (not shown) includes a plurality of multi-object selection gestures (two in the illustrated case) 506 and 508 each of which includes a stroke which passes over a different two or more of the information objects. More particularly, in the illustrated case, the first stroke 506 passes over the message from Jane Doe entitled "Resources For Feb." and also passes over a message from Jack Star entitled "UI Features" which was sent Jan. 3, 2012 at 2:40 PM, and the second stroke 508 passes over a message from Jim Brown entitled "Re: Testing Plan" which was sent Jan. 3, 2012 at 1:08 PM and also passes over a message from Jane Doe entitled "Testing Plan" which was sent Jan. 2, 2012 at 4:30 PM. Upon the identification of the plurality of multi-object selection gestures 506 and 508 and the identification of the fact that these gestures were made with the first user input modality, each of the different information objects that was passed over is selected, but is not opened.

Referring again to FIG. 5A, any of the aforementioned types of feedback can optionally be provided to the user in order to communicate that each different information object that is passed over 506 and 508 has been selected. By way of example but not limitation, upon the identification of each multi-object selection gesture 506 and 508 and the identification of the fact that the gesture was made using the second user input modality, the information objects that are passed over by this gesture can be visually highlighted. It will be appreciated that the visual highlighting can be implemented in various ways. One such way is exemplified in FIG. 5A where the visual highlighting is implemented as either a colored or shaded transparent overlay 510 and 512 which is displayed over the information objects that are passed over by the multi-object selection gestures 506 and 508.

As exemplified in FIG. 5B and referring again to FIG. 5A, the second screen-contacting gesture that the user makes on the display screen 502 using the second user input modality (not shown) is an object movement gesture 514. The object movement gesture exemplified in FIG. 5B is a stroke 514 which starts on top of any one of the selected information objects (in the illustrated case, the message from Jack Star entitled "UI Features") and ends on top of a desired one of the graphical elements 516 (in the illustrated case, the graphical element corresponding to the "Team Meetings" folder) within the second sector 504. Upon the identification of the object movement gesture 514 and the identification of the fact that this gesture was made using the second user input modality, the selected information objects (namely each of the different information objects that were passed over 506 and 508) are moved into the folder (in the illustrated case, the "Team Meetings" folder) that corresponds to the desired one of the graphical elements 516.

Referring again to FIG. 5B, any of the aforementioned types of feedback can optionally be provided to the user in order to communicate that the desired one of the graphical elements 516 in the second sector 504 has been selected by the object movement gesture 514. By way of example but not limitation, upon the object movement gesture 514 ending on top of the desired one of the graphical elements 516, a callout element 518 can be displayed adjacent to the desired one of the graphical elements. As exemplified in FIG. 5B, the callout element 518 can include one or more types of information about the desired one of the graphical elements 516 such as the name of the folder that corresponds thereto, thus allowing the user to read this name whenever the second user input modality is obstructing the desired one of the graphical elements. The callout element 518 is advantageous in that it serves as a magnifying glass which enhances the user's identification of the folder that corresponds to the desired one of the graphical elements 516, and thus helps the user move the selected information objects into this folder. After the selected information objects have been moved into the folder that corresponds to the desired one of the graphical elements 516, the callout element 518 can be removed from the display screen 502.

It will be appreciated that a variation of the information triage technique embodiment implementations exemplified in FIGS. 4A, 4B, 5A and 5B is possible where the first screen-contacting gesture that the user makes on the display screen using the first user input modality includes a combination of one or more single-object selection gestures and one or more multi-object selection gestures. In this case, upon the identification of the one or more single-object selection gestures and the identification of the fact that these gestures were made with the first user input modality, and upon the identification of the one or more multi-object selection gestures and the identification of the fact that these gestures were also made with the first user input modality, each of the different information objects that was either tapped on or passed over is selected, but is not opened.

Figure 6A:
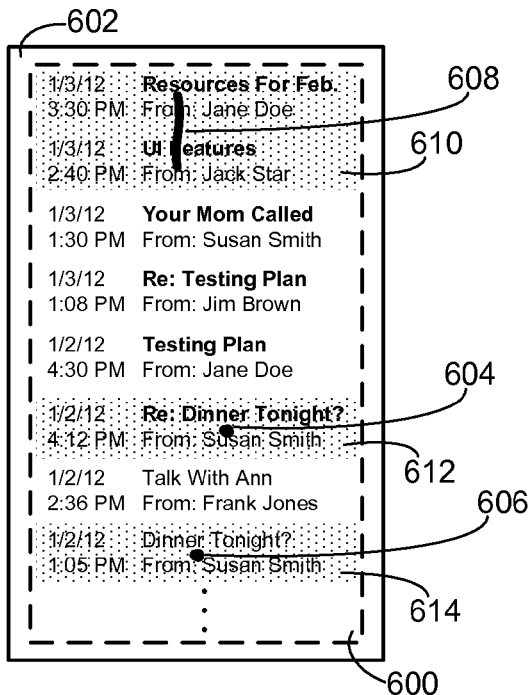
FIGS. 6A and 6B are diagrams illustrating yet another exemplary implementation, in simplified form, of the information triage technique embodiment exemplified in FIG. 1.
Figure 6B:
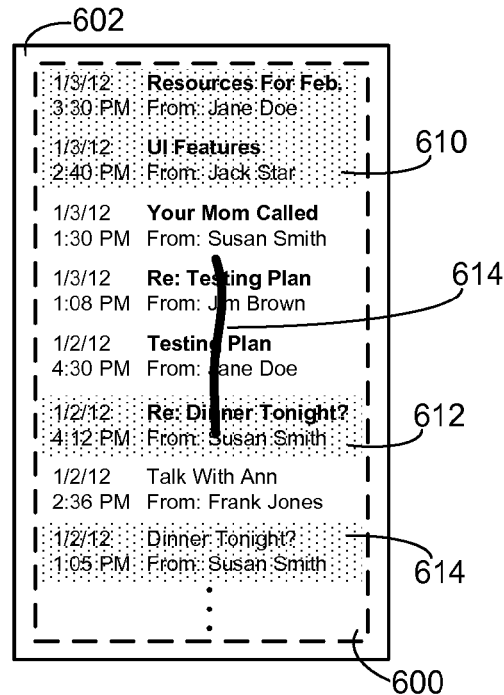

FIGS. 6A and 6B illustrate yet another exemplary implementation, in simplified form, of the information triage technique embodiment exemplified in FIG. 1. As exemplified in FIG. 6A, the same plurality of information objects as was just described in relation to FIG. 4A is displayed within a given sector 600 on the display screen 602 of the touch-enabled computing device. The first screen-contacting gesture that the user makes on the display screen 602 using the first user input modality (not shown) includes combination of one or more single-object selection gestures (two in the illustrated case) 604 and 606 and one or more multi-object selection gestures (one in the illustrated case) 608. Upon the identification of the one or more single-object selection gestures 604 and 606 and the identification of the fact that these gestures were made with the first user input modality, and upon the identification of the one or more multi-object selection gestures 608 and the identification of the fact that these gestures were also made with the first user input modality, each of the different information objects that was either tapped on or passed over is selected, but is not opened. Additionally, feedback of these selections can optionally be provided to the user in any of the aforementioned types of ways. By way of example but not limitation, each of the different information objects that was either tapped on or passed over can be visually highlighted 610/612/614.

As exemplified in FIG. 6B and referring again to FIG. 6A, the second screen-contacting gesture that the user makes on the display screen 602 using the second user input modality (not shown) is a scrolling gesture 614 which specifies how the information objects being displayed within the given sector 600 are to be scrolled there-within. The scrolling gesture exemplified in FIG. 6B is a substantially vertical stroke 614 which can occur anywhere within the sector 600. In an exemplary embodiment of the implementation illustrated in FIG. 6B, if the stroke 614 moves in a substantially upward direction this specifies that the information objects being displayed within the sector 600 are to be scrolled upward there-within. Correspondingly, if the stroke 614 moves in a substantially downward direction this specifies that the information objects being displayed within the sector 600 are to be scrolled downward there-within. Upon the identification of the scrolling gesture 614 and the identification of the fact that this gesture was made using the second user input modality, the information objects being displayed within the sector 600 are scrolled according to the scrolling gesture. More particularly, whenever the scrolling gesture 614 specifies that the information objects being displayed within the sector 600 are to be scrolled upward, they will be scrolled upward within the sector accordingly. Similarly, whenever the scrolling gesture 614 specifies that the information objects being displayed within the sector 600 are to be scrolled downward, they will be scrolled downward within the sector accordingly. It is notable that even though the information objects being displayed within the sector 600 are scrolled, the selection of the information objects that were tapped on 604 and 606 and passed over 608 is maintained, thus allowing the user to use the first user input modality to select additional information objects.

It will be appreciated that various other implementations of the scrolling gesture are also possible. By way of example but not limitation, the scrolling gesture can be a substantially horizontal stroke which can occur anywhere within the given sector. If this horizontal stroke moves in a substantially leftward direction the information objects being displayed within the sector can be scrolled leftward. Correspondingly, if this horizontal stroke moves in a substantially rightward direction the information objects being displayed within the sector can be scrolled rightward.

Figure 7:
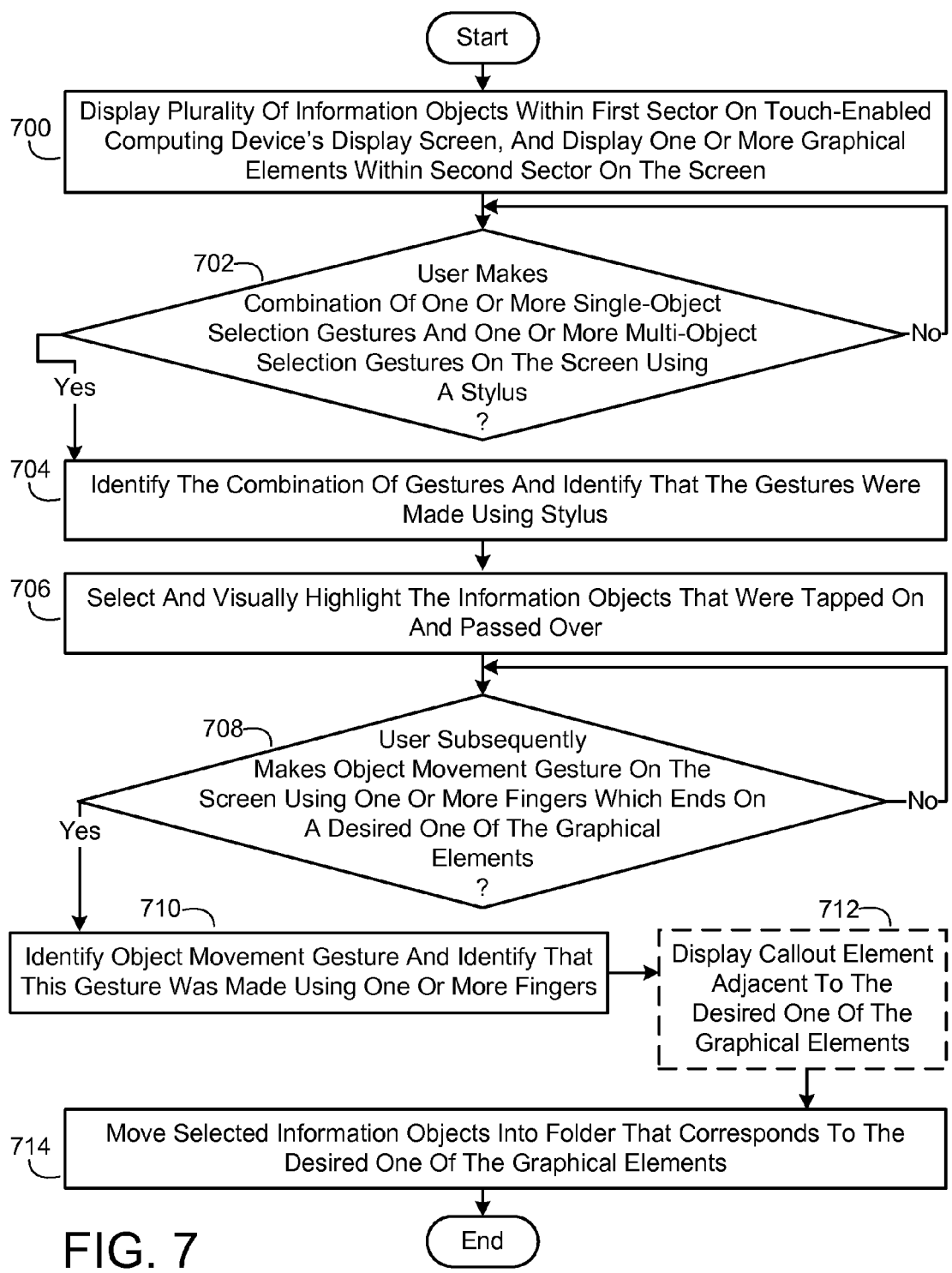
FIG. 7 is a flow diagram illustrating an exemplary embodiment, in simplified form, of a process which is associated with the information triage technique embodiment implementation illustrated in FIGS. 5A and 5B.

FIG. 7 illustrates an exemplary embodiment, in simplified form, of a process which is associated with the information triage technique embodiment implementation illustrated in FIGS. 6A and 6B. As exemplified in FIG. 7, the process starts in block 700 with displaying a plurality of information objects within a first sector on the computing device's display screen, and also displaying one or more graphical elements within a second sector on the display screen, where each of the graphical elements corresponds to a different folder. Whenever the user makes a combination of one or more single-object selection gestures and one or more multi-object selection gestures on the display screen using a stylus which is held by the user (block 702, Yes), where each of the single-object selection gestures taps on a different one of the information objects and each of the multi-object selection gestures includes a stroke which passes over a different two or more of the information objects, the following actions occur. This combination of gestures is identified and the fact that the gestures were made using the stylus is also identified (block 704). The information objects that were tapped on and passed over are then selected and visually highlighted (block 706). Whenever the user subsequently makes an object movement gesture on the display screen using one or more of their fingers (block 708, Yes), where the object movement gesture includes a stroke which starts on top of any one of the selected information objects and ends on top of a desired one of the graphical elements within the second sector, the following actions occur. The object movement gesture is identified and the fact that this gesture was made using one or more fingers is also identified (block 710). A callout element can then optionally be displayed adjacent to the desired one of the graphical elements (block 712), where the callout element includes the name of the folder that corresponds to the desired one of the graphical elements. The selected information objects are then moved into the folder that corresponds to the desired one of the graphical elements (block 714).

Additional exemplary implementations of the information triage technique embodiment exemplified in FIG. 1 will now be described which employ compound screen-contacting gestures which are made up of a sequence of two or more stroke segments where each adjacent pair of stroke segments in the sequence interconnect at an inflection point (i.e., a point in the gesture which corresponds to a distinct change in direction thereof).

The compound screen-contacting gestures can be interpreted in various ways. By way of example but not limitation, in one embodiment of the information triage technique described herein, whenever the user makes a compound screen-contacting gesture on the display screen of the touch-enabled computing device using a given user input modality, the gesture can be interpreted as follows. The entire sequence of stroke segments which make up the gesture, except for the final stroke segment of the gesture before the user input modality is lifted off of the display screen (i.e., the last stroke segment which follows the last inflection point), can be interpreted as the "scope" of the gesture (e.g., the information object(s) to be affected by the gesture). The final stroke segment of the gesture can be interpreted as specifying a particular information triage command which is to be applied to this scope. In an exemplary implementation of this particular embodiment the final stroke segment of the gesture can be made substantially along any of the eight cardinal compass directions (i.e., north, north-east, east, south-east, south, south-west, west, and north-west) to specify one of eight possible information triage commands. Other implementations of this particular embodiment are also possible where the final stroke segment of the gesture can also include more complex patterns (such as self-intersecting pigtail loops and the like), which can enable the specification of even more information triage commands. Generally speaking, since a given compound gesture can encapsulate the specification of both the scope of the gesture, and a particular information triage command that the user wishes to apply to this scope, the use of compound gestures provides for the rapid and efficient selection and triage of information objects.

In another embodiment of the information triage technique described herein, whenever the user makes a compound screen-contacting gesture on the display screen using a given user input modality, the entire sequence of stroke segments which make up the gesture, including the final stroke segment of the gesture before the user input modality is lifted off of the display screen, can be interpreted as the scope of the gesture. This particular embodiment is advantageous in the case where the information objects are displayed on the display screen as a two-dimensional array of graphical elements each of which corresponds to a different information object, since the user can make a gesture which includes a two-dimensional meandering pathway through the array.

Figure 8:
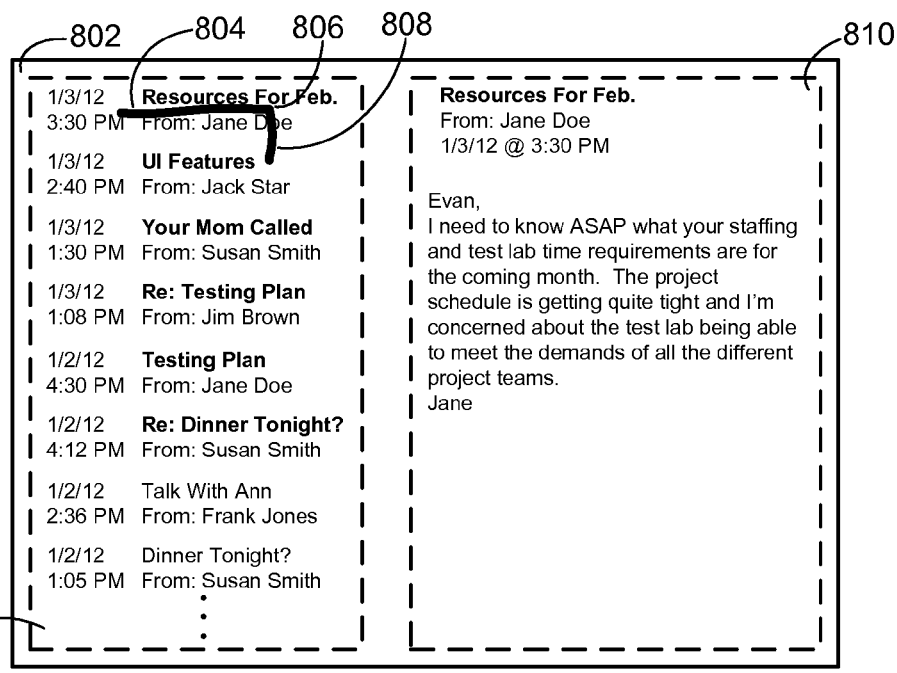
FIG. 8 is a diagram illustrating yet another exemplary implementation, in simplified form, of the information triage technique embodiment exemplified in FIG. 1.

FIG. 8 illustrates yet another exemplary implementation, in simplified form, of the information triage technique embodiment exemplified in FIG. 1, where this particular implementation involves just the first screen-contacting gesture. As exemplified in FIG. 8, the same plurality of information objects as was previously described in relation to FIG. 4A is displayed within a given sector 800 on the display screen 802 of the touch-enabled computing device. The first screen-contacting gesture that the user makes on the display screen 802 using the first user input modality (not shown) is an open in new sector gesture 804/806/808. The open in new sector gesture exemplified in FIG. 8 is a compound gesture which is made up of an initial stroke segment 804 and a final stroke segment 808 which interconnect at an inflection point 806, where the initial stroke segment 804 passes over a desired one of the information objects (in the illustrated case, the message from Jane Doe entitled "Resources For Feb."). Upon the identification of the open in new sector gesture 804/806/808 and the identification of the fact that this gesture was made using the first user input modality, the contents of the desired one of the information objects over which the initial stroke segment 804 passed are displayed within a new sector 810 on the display screen 802.

Referring again to FIG. 8, it is noted that in addition to the particular implementation of the open in new sector gesture 804/806/808 that is illustrated, various alternate implementations of this gesture (not shown) are also possible. By way of example, but not limitation, rather than the final stroke segment of this gesture moving in a substantially downward direction from the inflection point, the final stroke segment can move in a substantially upward direction from the inflection point, or in various other directions as well. The open in new sector gesture can also be implemented as a non-compound gesture which is made up of just a single stroke segment.

Figure 9:
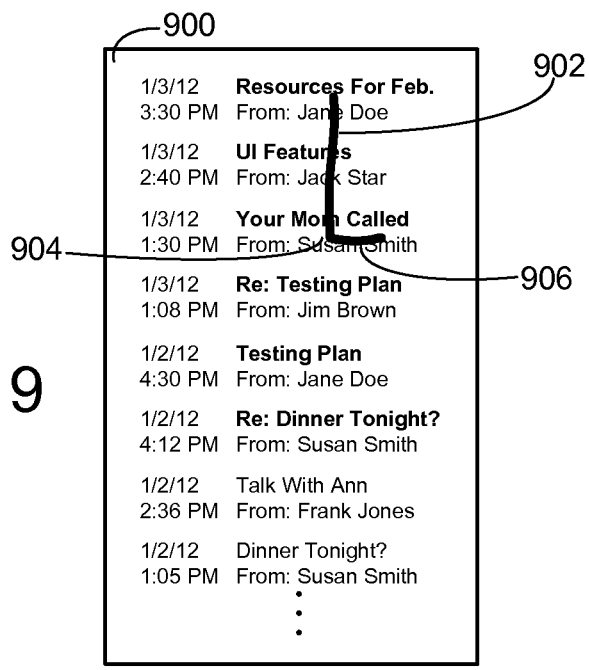
FIG. 9 is a diagram illustrating yet another exemplary implementation, in simplified form, of the information triage technique embodiment exemplified in FIG. 1.

FIG. 9 illustrates yet another exemplary implementation, in simplified form, of the information triage technique embodiment exemplified in FIG. 1, where this particular implementation also involves just the first screen-contacting gesture. As exemplified in FIG. 9, the same plurality of information objects as was previously described in relation to FIG. 4A is displayed on the display screen 900 of the touch-enabled computing device. The first screen-contacting gesture that the user makes on the display screen 900 using the first user input modality (not shown) is an object deletion gesture 902/904/906. The object deletion gesture exemplified in FIG. 9 is a compound gesture which is made up of an initial stroke segment 902 and a final stroke segment 906 which interconnect at an inflection point 904, where the initial stroke segment 902 passes over a desired one or more of the information objects (in the illustrated case, the message from Jane Doe entitled "Resources For Feb.", the message from Jack Star entitled "UI Features", and the message from Susan Smith entitled "Your Mom Called"). Upon the identification of the object deletion gesture 902/904/906 and the identification of the fact that this gesture was made using the first user input modality, the desired one or more of the information objects over which the initial stroke segment 902 passed are deleted.

Referring again to FIG. 9, it is noted that in addition to the particular implementation of the object deletion gesture 902/904/906 that is illustrated, various alternate implementations of this gesture (not shown) are also possible. By way of example but not limitation, rather than the final stroke segment of this gesture moving in a substantially rightward direction from the inflection point, the final stroke segment can move in a substantially leftward direction from the inflection point, or in various other directions as well. It will be appreciated that in addition to the aforementioned advantages of using a compound gesture, the use of a compound gesture for the object deletion gesture is further advantageous in that it minimizes the user's chance of accidentally deleting information objects. The object deletion gesture can also be implemented as a non-compound gesture which is made up of just a single stroke segment. In the case where the information objects are displayed on the display screen as a two-dimensional array of graphical elements each of which corresponds to a different information object, the object deletion gesture can be implemented as a compound gesture having more than two stroke segments, thus allowing the user to select three or more information objects whose graphical elements appear on two or more adjacent rows in the array.

Figure 10:
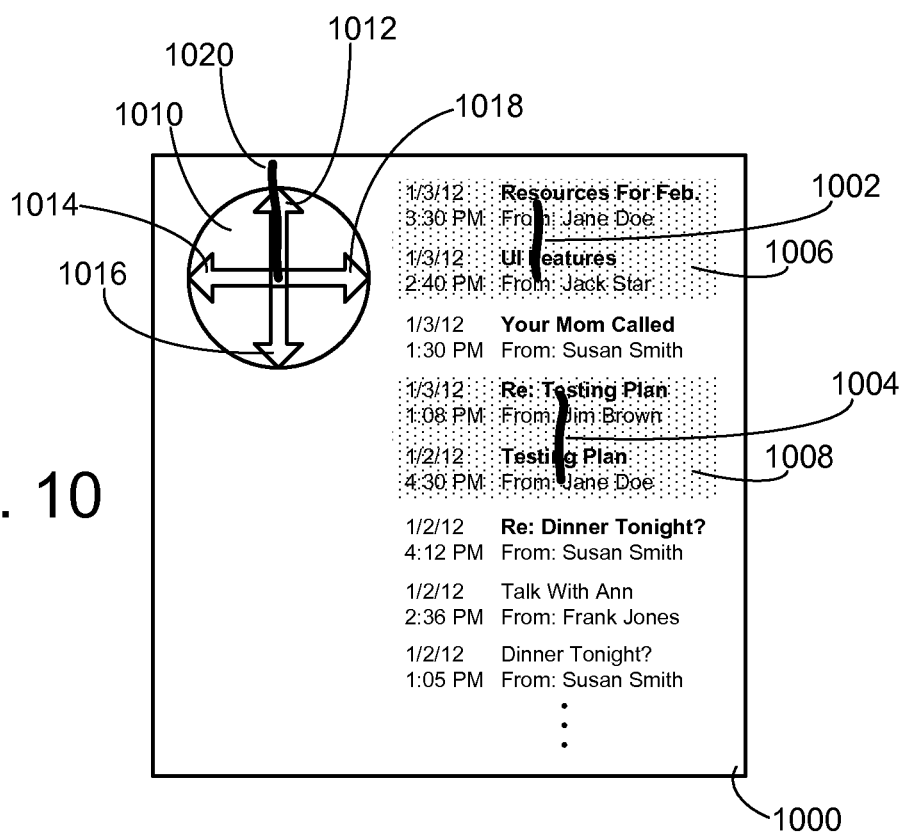
FIG. 10 is a diagram illustrating yet another exemplary implementation, in simplified form, of the information triage technique embodiment exemplified in FIG. 1.

FIG. 10 illustrates yet another exemplary implementation, in simplified form, of the information triage technique embodiment exemplified in FIG. 1. As exemplified in FIG. 10, the same plurality of information objects as was previously described in relation to FIG. 4A is displayed on the display screen 1000 of the touch-enabled computing device. The first screen-contacting gesture that the user makes on the display screen 1000 using the first user input modality (not shown) includes one or more multi-object selection gestures (two in the illustrated case) 1002 and 1004 each of which includes a stroke which passes over a different two or more of the information objects as described heretofore. Upon the identification of the one or more multi-object selection gestures 1002 and 1004 and the identification of the fact that these gestures were made with the first user input modality, each of the different information objects that was passed over is selected (but is not opened) and a command selection widget 1010 is displayed on the display screen 1000. Any of the aforementioned types of feedback (e.g., the colored or shaded transparent overlays 1006 and 1008) can optionally be provided to the user in order to communicate that each different information object that is passed over 1002 and 1004 has been selected. The command selection widget 1010 can be positioned in various places on the display screen 1000. As exemplified in FIG. 10, whenever possible the command selection widget 1010 will be positioned such that it does not obstruct the selected information objects.

Referring again to FIG. 10, the command selection widget 1010 generally allows the user to select a desired information triage command they wish to apply to the selected information objects (i.e., the information objects that are passed over by the multi-object selection gestures 1002 and 1004). It will be appreciated that the command selection widget 1010 can be implemented in various ways. By way of example but not limitation, the command selection widget 1010 illustrated in FIG. 10 includes one or more radial direction indicators (four in the illustrated case) 1012/1014/1016/1018, where each of these indicators is associated with a different information triage command and is oriented along a different one of the aforementioned cardinal compass directions (e.g., the northward-pointing radial direction indicator 1012 might be associated with a delete command). The number of radial direction indicators 1012/1014/1016/1018 that are included in the command selection widget 1010 and the different information triage commands that are associated with these indicators are dependent on the current operating context of the computing device at the time the multi-object selection gestures 1002 and 1004 are made (e.g., the particular types of information objects that are selected by the multi-object selection gestures).

Referring again to FIG. 10, after the command selection widget 1010 has been displayed on the display screen 1000, whenever the user subsequently makes another screen-contacting gesture on the screen using any user input modality (not shown) and this gesture includes a stroke which substantially passes over and directionally follows a given one of the radial directional indicators (e.g., the stroke 1020 which substantially passes over and directionally follows the northward-pointing radial direction indicator 1012), the following actions occur. The given one of the radial directional indicators (e.g., indicator 1012) is identified and a particular information triage command that is associated therewith (e.g., the aforementioned delete command) is also identified. This particular information triage command is then implemented on the information objects which were selected by the multi-object selection gestures 1002 and 1004 (e.g., the email message from Jane Doe entitled "Resources For Feb.", the email message from Jack Star entitled "UI Features", the email message from Jim Brown entitled "Re: Testing Plan", and the email message from Jane Doe entitled "Testing Plan" will be deleted). After the particular information triage command has been implemented, the command selection widget 1010 can be removed from the display screen 1000. Since the information triage technique embodiment implementation exemplified in FIG. 10 is based on the user having to perform a spatially-localized secondary screen-contacting gesture in order to activate a desired information triage command, this implementation is advantageous for certain types of information triage activities which if performed accidentally can be problematic for the user (such as deleting information objects, among others).

Referring again to FIG. 10, whenever the user touches anywhere on the command selection widget 1010 using any user input modality and maintains this touch for a prescribed period of time (e.g., approximately one second), a command palette (not shown) can optionally be displayed on the display screen 1000. The command palette serves to describe each of the currently available information triage commands and the particular radial directional indicator (e.g., indicator 1012) that is associated therewith. The user can also cause the command palette to be displayed in other ways including, but not limited to, the following. In the case described in more detail hereafter where a conventional digitizing tablet is connected to the touch-enabled computing device and the digitizing tablet includes stylus hover detection, the user can cause the command palette to be displayed by hovering the stylus over the digitizing tablet for the prescribed period of time. In the aforementioned case where the computing device includes a user-facing video camera, the user can cause the command palette to be displayed by hovering any user input modality over the command selection widget 1010 for the prescribed period of time.

1.3 Triaging Information Objects Using Concurrent Combination of Gestures

Figure 11:
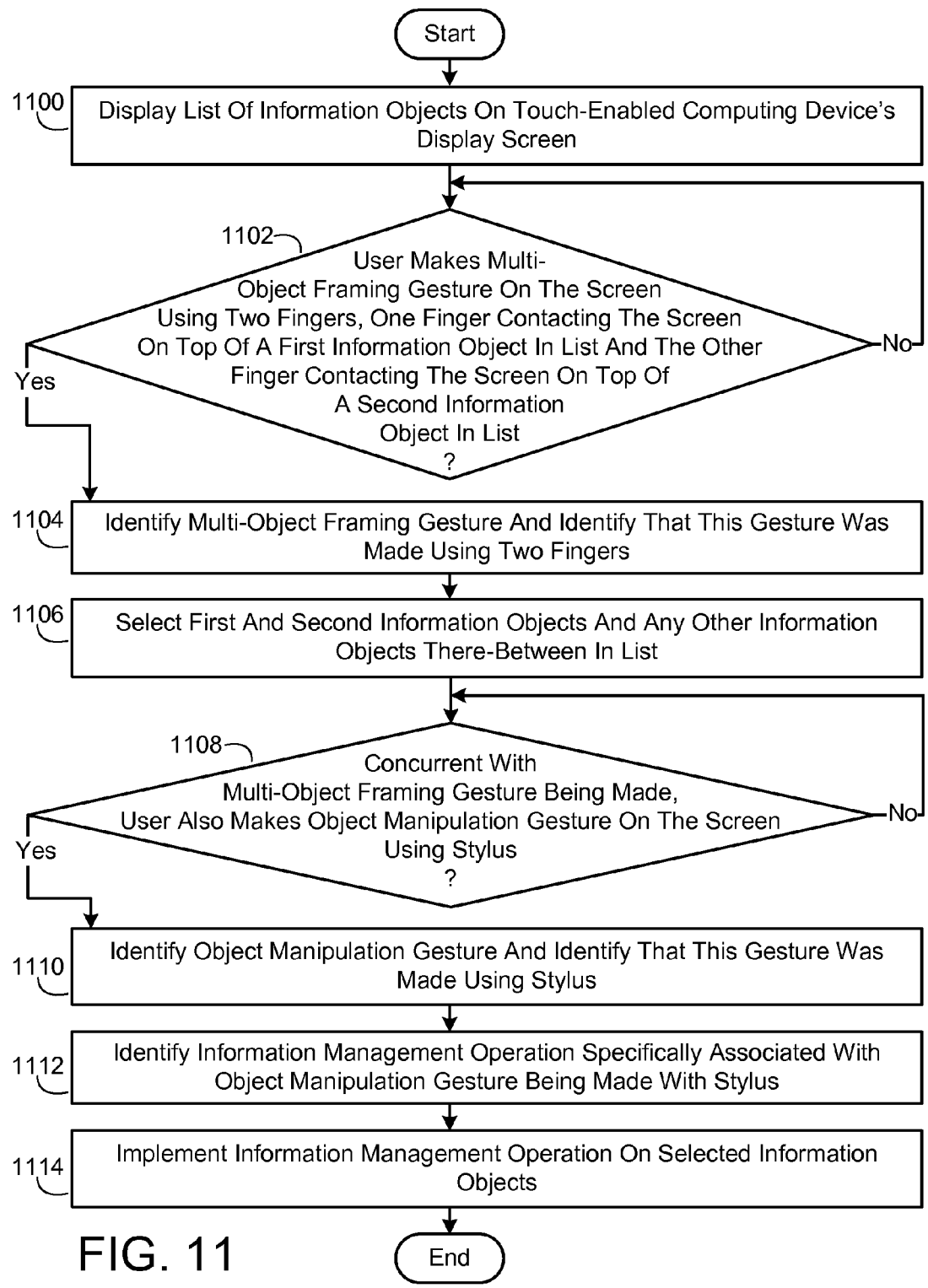
FIG. 11 is a flow diagram illustrating another embodiment, in simplified form, of a process for enabling a user to quickly triage information on a touch-enabled computing device._

FIG. 11 illustrates another embodiment, in simplified form, of a process for enabling a user to quickly triage information on a touch-enabled computing device. As will be appreciated from the more detailed description that follows, a concurrent combination of screen-contacting gestures can be employed in this embodiment. As exemplified in FIG. 11, the process starts in block 1100 with displaying a list of information objects on the computing device's display screen. Whenever the user makes a multi-object framing gesture on the display screen using two fingers (such as a thumb and forefinger, among various other possible finger combinations), where one of the fingers contacts the screen on top of a first information object in the list and the other of the fingers contacts the screen on top of a second information object in the list (block 1102, Yes), the following actions occur. The multi-object framing gesture is identified and the fact that this gesture was made using two fingers is also identified (block 1104). The first and second information objects and any other information objects there-between in the list are then selected (block 1106).

Referring again to FIG. 11, whenever, concurrent with the multi-object framing gesture being made, the user also makes an object manipulation gesture on the display screen using a stylus which is held by the user (block 1108, Yes), where the object manipulation gesture includes one or more strokes each of which passes over one or more of the selected information objects, the following actions occur. The object manipulation gesture is identified and the fact that this gesture was made using the stylus is also identified (block 1110). An information management operation that is specifically associated with the object manipulation gesture being made with the stylus is then identified (block 1112). The information management operation is then implemented on the selected information objects (block 1114). The information triage technique embodiment exemplified in FIG. 11 is advantageous in that it allows certain advanced/shortcut gestures to just be supported as concurrent pen and touch gestures.

In one implementation of the information triage technique embodiment exemplified in FIG. 11 the selection of the information objects made by the multi-object framing gesture is maintained for as long as the user makes this gesture on the display screen (i.e., the selection mode is exited when the user lifts their two fingers off of the screen). In an alternate implementation of the embodiment exemplified in FIG. 11 the selection of the information objects made by the multi-object framing gesture remains active even if the user lifts their two fingers off of the screen, thus allowing the user to make the object manipulation gesture on the display screen in sequence after the framing gesture using the same hand that made the framing gesture (i.e., allowing the user to operate the touch-enabled computing device in a "one-handed" manner).

Exemplary implementations of the information triage technique embodiment exemplified in FIG. 11 will now be described. In these particular implementations the list of information objects which is displayed on the display screen of the touch-enabled computing device includes the aforementioned list of email messages which have been sent to the user. However, it will be appreciated that in addition to email messages, the information triage technique embodiments exemplified in FIG. 11 are also operational with the aforementioned wide variety of other types of information objects. It will further be appreciated that in addition to the information objects being displayed in the form of a list, the information objects can also be displayed on the display screen in the aforementioned various other ways.

Figure 12A:
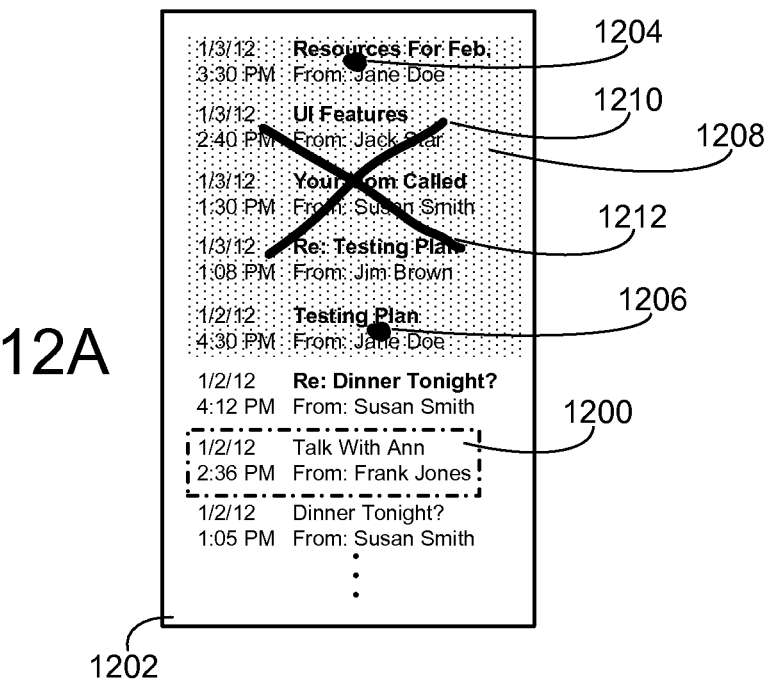
FIGS. 12A and 12B are diagrams illustrating two different exemplary implementations, in simplified form, of the information triage technique embodiment exemplified in FIG. 11.
Figure 12B:
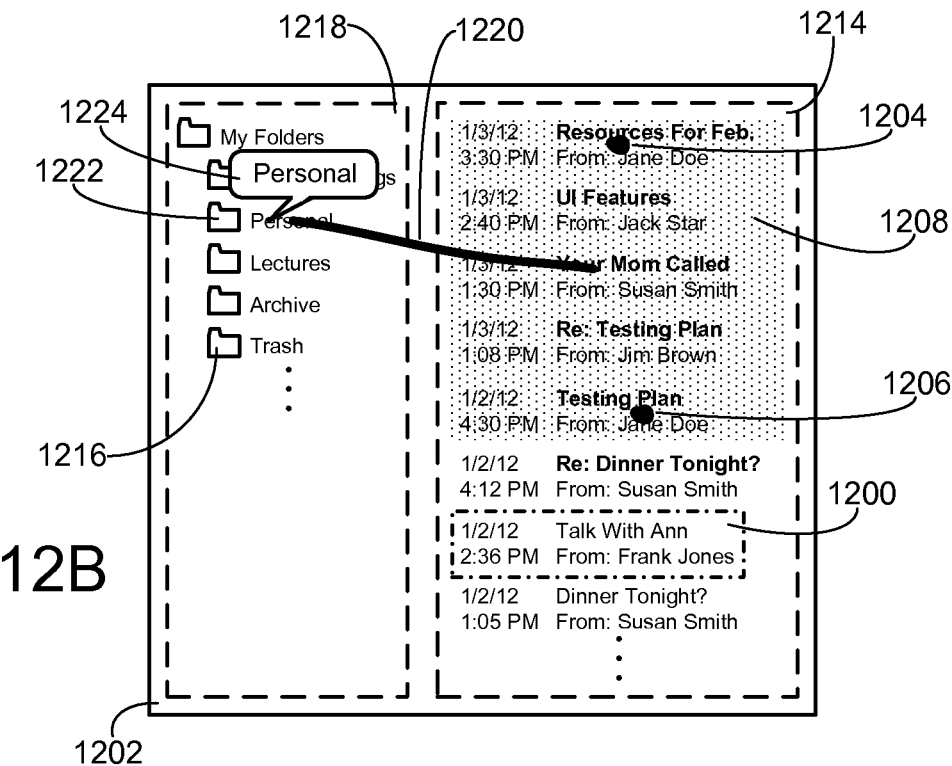

FIGS. 12A and 12B illustrate two different exemplary implementations, in simplified form, of the information triage technique embodiment exemplified in FIG. 11. As exemplified in FIGS. 12A and 12B, a list of information objects (which includes a list of email messages (e.g., message 1200) in the illustrated case) is displayed on the display screen 1202 of the touch-enabled computing device. The user makes the multi-object framing gesture 1204 and 1206 on the display screen 1202 using two fingers (not shown), where one of the fingers contacts the screen on top 1204 of a first information object in the list (in the illustrated case, the message from Jane Doe entitled "Resources For Feb.") and the other of the fingers contacts the screen on top 1206 of a second information object in the list (in the illustrated case, the message from Jane Doe entitled "Testing Plan"). The framing gesture 1204 and 1206 thus serves to frame a series of information objects between and including the first and second information objects in the list. Upon the identification of the framing gesture 1204 and 1206 and the identification of the fact that this gesture was made using two fingers, the first and second information objects and any other information objects there-between in the list (in the illustrated case, the message from Jack Star entitled "UI Features", the message from Susan Smith entitled "Your Mom Called", and the message from Jim Brown entitled "Re: Testing Plan") are selected, but are not opened. This information object selection will be maintained for as long as the user makes the framing gesture 1204 and 1206 on the display screen 1202.

Referring again to FIGS. 12A and 12B, any of the aforementioned types of feedback can optionally be provided to the user in order to communicate that the series of information objects which are framed by the multi-object framing gesture 1204 and 1206 have been selected. By way of example but not limitation, upon the identification of the framing gesture 1204 and 1206 and the identification of the fact that this gesture was made using two fingers, the series of information objects that are framed by this gesture can be visually highlighted 1208 as described heretofore.

In the particular implementation exemplified in FIG. 12A, the object manipulation gesture that the user makes on the display screen 1202 using the stylus (not shown) is an object deletion gesture which includes a pair of strokes 1210 and 1212 which intersect one another, where both of the strokes passes over one or more of the selected information objects. Upon the identification of the object deletion gesture 1210 and 1212 and the identification of the fact that this gesture was made using the stylus, the selected information objects are deleted. Alternate embodiments (not shown) of the object deletion gesture are also possible including, but not limited to, the following. The object deletion gesture can include one or more vertical strokes each of which passes over one or more of the selected information objects. The object deletion gesture can also include one or more horizontal strokes each of which passes over one or more of the selected information objects.

In the particular implementation exemplified in FIG. 12B, the just described list of information objects is displayed within a first sector 1214 on the display screen 1202 of the touch-enabled computing device. One or more graphical elements (e.g., element 1216), each of which corresponds to a different folder that represents a different category, are displayed within a second sector 1218 on the display screen 1202. The object manipulation gesture that the user makes on the display screen 1202 using the stylus is an object movement gesture 1220. Generally speaking, the user can employ various types of object movement gestures to quickly file the selected information objects (namely the series of information objects which are framed by the multi-object framing gesture 1204 and 1206) into a desired folder, or quickly move them into the trash. By way of example but not limitation, the object movement gesture illustrated in FIG. 12B is a stroke 1220 which starts on top of any one of the selected information objects (in the illustrated case, the message from Susan Smith entitled "Your Mom Called") and ends on top of a desired one of the graphical elements 1222 (in the illustrated case, the graphical element corresponding to the "Personal" folder) within the second sector 1218. Upon the identification of the object movement gesture 1220 and the identification of the fact that this gesture was made using the stylus, the selected information objects are moved into the folder (in the illustrated case, the "Personal" folder) that corresponds to the desired one of the graphical elements 1222. In a non-illustrated case where the object movement gesture ends on top of the graphical element 1216 within the second sector 1218 that corresponds to the "Trash" folder, the selected information objects will be moved into the trash.

Referring again to FIG. 12B, any of the aforementioned types of feedback can optionally be provided to the user in order to communicate that the desired one of the graphical elements 1222 in the second sector 1218 has been selected by the object movement gesture 1220. By way of example but not limitation, upon the object movement gesture 1220 ending on top of the desired one of the graphical elements 1222, a callout element 1224 can be displayed on the display screen 1202 adjacent to the desired one of the graphical elements, where this callout element has the aforementioned characteristics and advantages. After the selected information objects have been moved into the folder that corresponds to the desired one of the graphical elements 1222, the callout element 1224 can be removed from the display screen 1202.

2.0 Additional Embodiments

While the information triage technique has been described by specific reference to embodiments thereof, it is understood that variations and modifications thereof can be made without departing from the true spirit and scope of the information triage technique. By way of example but not limitation, an alternate embodiment of the touch-enabled computing device is possible where a conventional digitizing tablet (also known as a "graphics tablet" or a "drawing tablet", among other things) is connected to the computing device. In such an alternate embodiment, the various screen-contacting gestures described herein which are made by the stylus (or any other passive or active object for that matter) can also be made on the digitizing tablet, while the screen-contacting gestures described herein which are made by one or more fingers can continue to be made on the display screen of the computing device.

Furthermore, in addition to the screen-contacting gestures being made by the user as an independent sequence of gestures or as a concurrent combination of gestures, an alternate embodiment of the information triage technique described herein is possible where a given screen-contacting gesture can operate independently without the occurrence of a companion gesture, thus allowing the user to operate the touch-enabled computing device in a "one-handed" manner. In other words, a distinct action can be assigned to a given gesture which is made by a given modality. By way of example but not limitation, in the aforementioned situation where a plurality of information objects is displayed within a given sector on the display screen of the touch-enabled computing device, whenever the user makes a screen-contacting stroke anywhere within the sector using one or more fingers this stroke can operate to scroll the information objects within the sector. Whenever the user makes a screen-contacting stroke within the sector using a stylus and this stroke passes over one or more of the information objects, this stroke can operate to delete each of the information objects that was passed over.

Another alternate embodiment of the information triage technique described herein is also possible where in addition to the user being able to delete the selected information objects by making the object deletion gesture, the aforementioned command selection widget can be displayed on the display screen and one of the radial direction indicators included in this widget can be associated with a delete command. Whenever the user makes a screen-contacting gesture on the screen using any user input modality and this gesture includes a stroke which substantially passes over and directionally follows the radial direction indicator that is associated with the delete command, the selected information objects will be deleted.

Yet another alternate embodiment of the information triage technique described herein is also possible where a "distinguished touch" can serve the role of either the first user input modality, or the second user input modality, or both the first and second user input modalities. The term "distinguished touch" refers to the ability of the touch-enabled computing device to distinguish between different types of secondary touches (e.g., second, third, and so on) that are made by the user on the display screen using a given user input modality immediately after the user makes an initiating touch using this modality. By way of example but not limitation, the computing device could determine various properties of each touch that the user makes on the screen such as the contact area of the touch, the pressure of the touch, and a fingerprint associated with the touch, among other things. The computing device could then use these properties to distinguish which of the user's fingers is touching the screen and/or which of the user's hands made the touch, among other things. This would allow thumb and forefinger inputs to be treated distinct from one another, or inputs made by the user's left hand to be treated distinct from inputs made by the user's right hand.

It is also noted that any or all of the aforementioned embodiments can be used in any combination desired to form additional hybrid embodiments. Although the information triage technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

Figure 13:
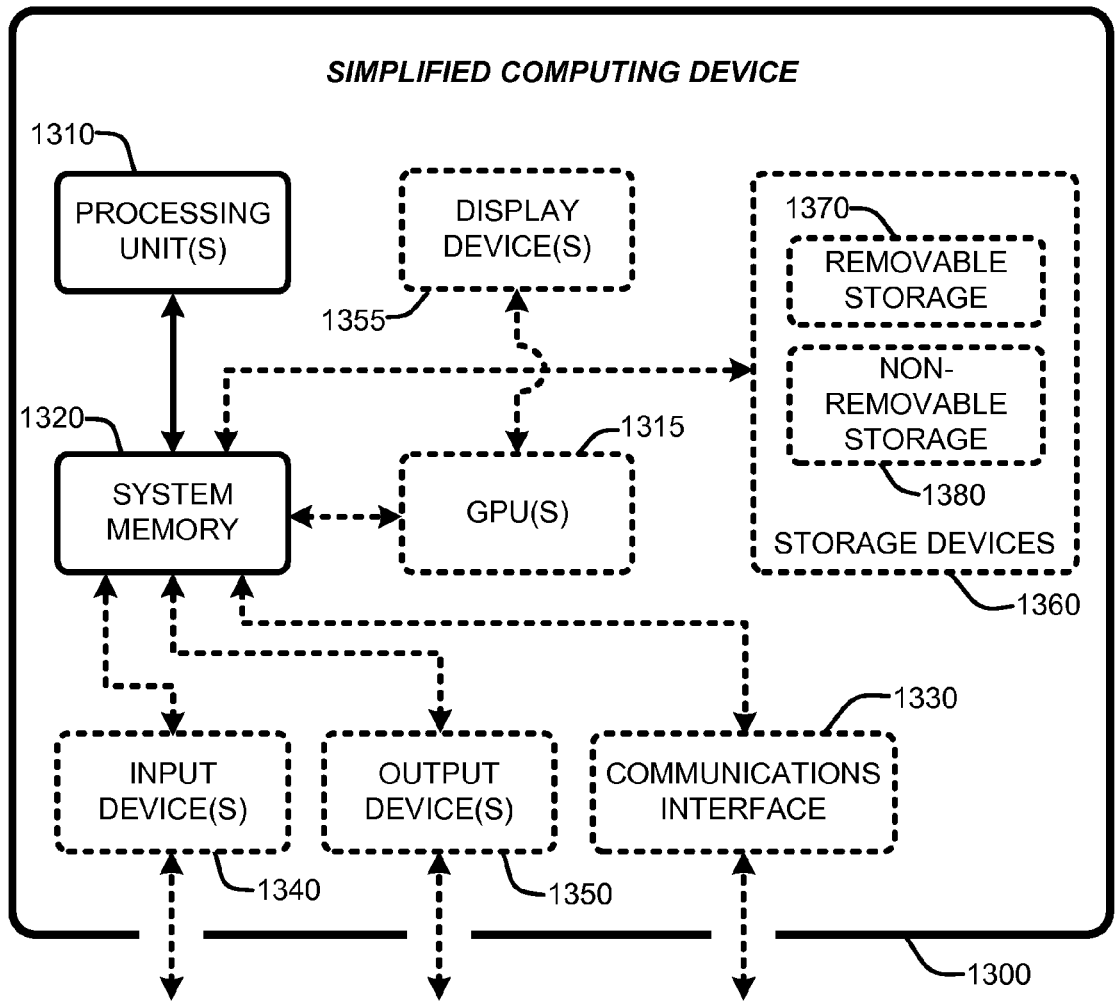
FIG. 13 is a diagram illustrating a simplified example of a general-purpose computer system on which various embodiments and elements of the information triage technique, as described herein, may be implemented.

The information triage technique embodiments described herein are operational within numerous types of general purpose or special purpose computing system environments or configurations. FIG. 13 illustrates a simplified example of a general-purpose computer system on which various embodiments and elements of the information triage technique, as described herein, may be implemented. It should be noted that any boxes that are represented by broken or dashed lines in FIG. 13 represent alternate embodiments of the simplified computing device, and that any or all of these alternate embodiments, as described below, may be used in combination with other alternate embodiments that are described throughout this document.

For example, FIG. 13 shows a general system diagram showing a simplified computing device 1300. Such computing devices can be typically be found in devices having at least some minimum computational capability, including, but not limited to, personal computers (PCs), server computers, handheld computing devices, laptop or mobile computers, communications devices such as cell phones and the like, multiprocessor systems, microprocessor-based systems, set top boxes, programmable consumer electronics, network PCs, minicomputers, mainframe computers, and audio or video media players.

To allow a device to implement the information triage technique embodiments described herein, the device should have a sufficient computational capability and system memory to enable basic computational operations. In particular, as illustrated by FIG. 13, the computational capability is generally illustrated by one or more processing unit(s) 1310, and may also include one or more graphics processing units (GPUs) 1315, either or both in communication with system memory 1320. Note that that the processing unit(s) 1310 may be specialized microprocessors (such as a digital signal processor (DSP), a very long instruction word (VLIW) processor, or other micro-controller) or can be conventional central processing units (CPUs) having one or more processing cores including, but not limited to, specialized GPU-based cores in a multi-core CPU.

In addition, the simplified computing device 1300 of FIG. 13 may also include other components, such as, for example, a communications interface 1330. The simplified computing device 1300 of FIG. 13 may also include one or more conventional computer input devices 1340 (e.g., pointing devices, keyboards, audio input devices, video input devices, haptic input devices, devices for receiving wired or wireless data transmissions, and the like). The simplified computing device 1300 of FIG. 13 may also include other optional components, such as, for example, one or more conventional computer output devices 1350 (e.g., display device(s) 1355, audio output devices, video output devices, devices for transmitting wired or wireless data transmissions, and the like). It will be appreciated that in the case where the display device(s) 1355 include the aforementioned touch-sensitive display screen, the display device(s) also serve as an input device(s). Note that typical communications interfaces 1330, input devices 1340, output devices 1350, and storage devices 1360 for general-purpose computers are well known to those skilled in the art, and will not be described in detail herein.

The simplified computing device 1300 of FIG. 13 may also include a variety of computer readable media. Computer readable media can be any available media that can be accessed by the computer 1300 via storage devices 1360, and includes both volatile and nonvolatile media that is either removable 1370 and/or non-removable 1380, for storage of information such as computer-readable or computer-executable instructions, data structures, program modules, or other data. By way of example but not limitation, computer readable media may include computer storage media and communication media. Computer storage media includes, but is not limited to, computer or machine readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the information triage technique described herein, or portions thereof, may be stored, received, transmitted, or read from any desired combination of computer or machine readable media or storage devices and communication media in the form of computer executable instructions or other data structures.

Finally, the information triage technique embodiments described herein may be further described in the general context of computer-executable instructions, such as program modules, being executed by a computing device. Generally, program modules include routines, programs, objects, components, data structures, and the like, that perform particular tasks or implement particular abstract data types. The information triage technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for enabling a user to triage information on a touch-enabled computing device, comprising:

using the computing device to perform the following process actions:

displaying one or more information objects on a touch-sensitive display screen of the computing device;

whenever the user completes a first screen-contacting gesture on the screen using a first user input modality and removes the first user input modality from the screen,
identifying the first screen-contacting gesture and identifying that said gesture was made using the first user input modality,
identifying a first information management operation that is specifically associated with the first screen-contacting gesture made using the first user input modality, and
implementing the first information management operation on the information objects; and whenever the user subsequently makes a second screen-contacting gesture on the screen using a second user input modality which is different than the first user input modality,
identifying the second screen-contacting gesture and identifying that said gesture was made using the second user input modality, identifying a second information management operation that is specifically associated with the second screen-contacting gesture made using the second user input modality, and implementing the second information management operation on the information objects.

2. The process of claim 1, wherein the first user input modality comprises a stylus which is held by the user, and the second user input modality comprises one or more fingers of the user.

3. The process of claim 1, wherein the first user input modality comprises one or more fingers of the user, and the second user input modality comprises a stylus which is held by the user.

4. The process of claim 1, wherein, the process action of displaying one or more information objects on a touch-sensitive display screen of the computing device comprises an action of displaying a list of email messages within a first sector on the screen, the first screen-contacting gesture comprises a reply gesture comprising a stroke which starts on top of a desired one of the email messages in said list and ends within a second sector on the screen, the process action of implementing the first information management operation on the information objects comprises the actions of displaying the contents of the desired one of the email messages within the second sector, and then displaying a digital inking sector on top of a portion of said contents, the second screen-contacting gesture comprises a sector resizing gesture which specifies how to modify the size of the digital inking sector, and the process action of implementing the second information management operation on the information objects comprises an action of modifying the size of the digital inking sector according to the sector resizing gesture.

5. The process of claim 4, further comprising an action of, whenever the user makes one or more strokes on the screen within the digital inking sector using the first user input modality, identifying that said strokes were made within the digital inking sector using the first user input modality, digitizing each of said strokes thus creating an electronic ink representation thereof, and displaying said digitization within the digital inking sector.

6. The process of claim 5, further comprising an action of automatically increasing the size of the digital inking sector as necessary to accommodate the one or more strokes the user makes on the screen within said sector.

7. The process of claim 1, wherein the process action of displaying one or more information objects on a touch-sensitive display screen of the computing device comprises an action of displaying a plurality of information objects within a first sector on the screen, further comprising an action of displaying one or more graphical elements within a second sector on the screen, each of the graphical elements corresponding to a different folder, wherein, the first screen-contacting gesture comprises a plurality of single-object selection gestures each of which taps on a different one of the information objects, the process action of implementing the first information management operation on the information objects comprises an action of selecting said tapped on information objects, the second screen-contacting gesture comprises an object movement gesture comprising a stroke which starts on top of any one of the selected information objects and ends on top of a desired one of the graphical elements within the second sector, and the process action of implementing the second information management operation on the information objects comprises an action of moving the selected information objects into the folder that corresponds to the desired one of the graphical elements.

8. The process of claim 1, wherein the process action of displaying one or more information objects on a touch-sensitive display screen of the computing device comprises an action of displaying a plurality of information objects within a first sector on the screen, further comprising an action of displaying one or more graphical elements within a second sector on the screen, each of the graphical elements corresponding to a different folder, wherein, the first screen-contacting gesture comprises a plurality of multi-object selection gestures each of which comprises a stroke which passes over a different two or more of the information objects, the process action of implementing the first information management operation on the information objects comprises an action of selecting said passed over information objects, the second screen-contacting gesture comprises an object movement gesture comprising a stroke which starts on top of any one of the selected information objects and ends on top of a desired one of the graphical elements within the second sector, and the process action of implementing the second information management operation on the information objects comprises an action of moving the selected information objects into the folder that corresponds to the desired one of the graphical elements.

9. The process of claim 1, wherein the process action of displaying one or more information objects on a touch-sensitive display screen of the computing device comprises an action of displaying a plurality of information objects within a first sector on the screen, further comprising an action of displaying one or more graphical elements within a second sector on the screen, each of the graphical elements corresponding to a different folder, wherein, the first screen-contacting gesture comprises a combination of one or more single-object selection gestures and one or more multi-object selection gestures, each of the single-object selection gestures taps on a different one of the information objects, each of the multi-object selection gestures comprises a stroke which passes over a different two or more of the information objects, the process action of implementing the first information management operation on the information objects comprises an action of selecting said tapped on and passed over information objects, the second screen-contacting gesture comprises an object movement gesture comprising a stroke which starts on top of any one of the selected information objects and ends on top of a desired one of the graphical elements within the second sector, and the process action of implementing the second information management operation on the information objects comprises an action of moving the selected information objects into the folder that corresponds to the desired one of the graphical elements.

10. The process of claim 9, wherein the process action of implementing the first information management operation on the information objects further comprises an action of visually highlighting the information objects that are tapped on by the single-object selection gestures and passed over by the multi-object selection gestures.

11. The process of claim 9, wherein the process action of implementing the second information management operation on the information objects further comprises an action of displaying a callout element adjacent to the desired one of the graphical elements, wherein the callout element comprises a name of the folder that corresponds to the desired one of the graphical elements, thus allowing the user to read said name whenever the second user input modality is obstructing the desired one of the graphical elements.

12. The process of claim 1, wherein,
the process action of displaying one or more information objects on a touch-sensitive display screen of the computing device comprises an action of displaying a plurality of information objects within a given sector on the screen,
the first screen-contacting gesture comprises a combination of one or more single-object selection gestures and one or more multi-object selection gestures,
each of the single-object selection gestures taps on a different one of the information objects,
each of the multi-object selection gestures comprises a stroke which passes over a different two or more of the information objects,
the process action of implementing the first information management operation on the information objects comprises an action of selecting said tapped on and passed over information objects,
the second screen-contacting gesture comprises a scrolling gesture which specifies how the information objects being displayed within the sector are to be scrolled there-within, and
the process action of implementing the second information management operation on the information objects comprises an action of scrolling the information objects being displayed within the sector according to the scrolling gesture while maintaining the selection of said tapped on and passed over information objects.

13. The process of claim 1, wherein,
the one or more information objects are displayed within a first sector on the screen,
the first screen-contacting gesture is made within a first one or more sectors on the screen, one of which is the first sector,
the process action of identifying a first information management operation that is specifically associated with the first screen-contacting gesture being made with the first user input modality comprises the actions of,
identifying said first one or more sectors, and
identifying a first operating context of the computing device at the time the first screen-contacting gesture is made, wherein the first information management operation is specific to said first one or more sectors and said first operating context,
the second screen-contacting gesture is made within a second one or more sectors on the screen, one of which is the same as one of said first one or more sectors, and
the process action of identifying a second information management operation that is specifically associated with the second screen-contacting gesture being made with the second user input modality comprises the actions of,
identifying said second one or more sectors, and
identifying a second operating context of the computing device at the time the second screen-contacting gesture is made, wherein the second information management operation is specific to said second one or more sectors and said second operating context.

14. The process of claim 1, wherein,
the one or more information objects is displayed within a given sector on the screen,
the first screen-contacting gesture comprises an open in new sector gesture comprising an initial stroke segment and a final stroke segment which interconnect at an inflection point, wherein the initial stroke segment passes over a desired one of the information objects, and
the process action of implementing the first information management operation on the information objects comprises an action of displaying the contents of the desired one of the information objects within a new sector on the screen.

15. The process of claim 1, wherein,
the first screen-contacting gesture comprises an object deletion gesture comprising an initial stroke segment and a final stroke segment,
the end of the initial stroke segment is connected to the beginning of the final stroke segment,
said connection forms an inflection point,
the initial stroke segment passes over a desired one or more of the information objects, and
the process action of implementing the first information management operation on the information objects comprises an action of deleting the desired one or more of the information objects.

16. The process of claim 1, wherein,
the process action of displaying one or more information objects on a touch-sensitive display screen of the computing device comprises an action of displaying a plurality of information objects on the screen,
the first screen-contacting gesture comprises one or more multi-object selection gestures each of which comprises a stroke which passes over a different two or more of the information objects,
the process action of implementing the first information management operation on the information objects comprises the actions of selecting said passed over information objects and displaying a command selection widget on the screen,
the command selection widget comprises one or more radial direction indicators each of which is associated with a different information triage command, and
the number of said indicators and the different information triage command that is associated with each of said indicators are dependent on a current operating context of the computing device,
further comprising the actions of, whenever the user subsequently makes another screen-contacting gesture on the screen using any user input modality and said other screen-contacting gesture comprises a stroke which substantially passes over and directionally follows a given one of the radial direction indicators,
identifying said given one of the radial direction indicators and identifying a particular information triage command that is associated therewith, and
implementing said particular information triage command on the selected information objects.

17. A computer-implemented process for enabling a user to quickly triage information on a touch-enabled computing device, comprising:
using the computing device to perform the following process actions:
displaying a list of information objects on a touch-sensitive display screen of the computing device;

whenever the user makes a multi-object framing gesture on the screen using two fingers, wherein one of the fingers contacts the screen on top of a first information object in the list and the other of the fingers contacts the screen on top of a second information object in the list, identifying said framing gesture and identifying that said framing gesture was made using two fingers, and selecting the first and second information objects and any other information objects there-between in the list; and whenever, concurrent with said framing gesture being made on the screen, the user also makes an object manipulation gesture on the screen using a stylus which is held by the user, wherein the object manipulation gesture comprises one or more strokes each of which passes over one or more of the selected information objects, identifying the object manipulation gesture and identifying that said gesture was made using the stylus, identifying an information management operation that is specifically associated with the object manipulation gesture being made with the stylus, and implementing the information management operation on the selected information objects.

18. The process of claim 17, wherein, the object manipulation gesture comprises an object deletion gesture, the one or more strokes comprise either one or more vertical strokes, or one or more horizontal strokes, or a pair of strokes which intersect one another, and the process action of implementing the information management operation on the selected information objects comprises an action of deleting the selected information objects.

19. The process of claim 17, wherein the list of information objects is displayed within a first sector on the screen, further comprising an action of displaying one or more graphical elements within a second sector on the screen, each of the graphical elements corresponding to a different folder, wherein, the object manipulation gesture comprises an object movement gesture comprising a stroke which starts on top of any one of the selected information objects and ends on top of a desired one of the graphical elements within the second sector, and the process action of implementing the information management operation on the selected information objects comprises an action of moving the selected information objects into the folder that corresponds to the desired one of the graphical elements.

20. A computer-implemented process for enabling a user to quickly triage information on a touch-enabled computing device, comprising:

using the computing device to perform the following process actions:

displaying a plurality of information objects within a first sector on a touch-sensitive display screen of the computing device;

displaying one or more graphical elements within a second sector on the screen, each of the graphical elements corresponding to a different folder;

whenever the user makes a combination of one or more single-object selection gestures and one or more multi-object selection gestures on the screen using a stylus which is held by the user, wherein each of the single-object selection gestures taps on a different one of the information objects, and each of the multi-object selection gestures comprises a stroke which passes over a different two or more of the information objects, identifying said combination of gestures and identifying that said single-object selection gestures and said multi-object selection gestures were made using the stylus, and selecting and visually highlighting said tapped on and passed over information objects; and whenever the user subsequently makes an object movement gesture on the screen using one or more of their fingers, wherein the object movement gesture comprises a stroke which starts on top of any one of the selected information objects and ends on top of a desired one of the graphical elements within the second sector, identifying the object movement gesture and identifying that said gesture was made using said fingers, displaying a callout element adjacent to the desired one of the graphical elements, wherein the callout element comprises a name of the folder that corresponds to the desired one of the graphical elements, and moving the selected information objects into the folder that corresponds to the desired one of the graphical elements.

* * * * *